(12) United States Patent
Luo

(10) Patent No.: US 12,374,942 B2
(45) Date of Patent: Jul. 29, 2025

(54) STATOR, MOTOR AND VEHICLE

(71) Applicant: XIAOMI EV TECHNOLOGY CO., LTD., Beijing (CN)

(72) Inventor: Wenhui Luo, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 244 days.

(21) Appl. No.: 18/071,513

(22) Filed: Nov. 29, 2022

(65) Prior Publication Data

US 2024/0048009 A1    Feb. 8, 2024

(30) Foreign Application Priority Data

Aug. 5, 2022   (CN) .......................... 202210940378.4

(51) Int. Cl.
*H02K 1/20* (2006.01)
*H02K 9/19* (2006.01)

(52) U.S. Cl.
CPC .................. *H02K 1/20* (2013.01); *H02K 9/19* (2013.01)

(58) Field of Classification Search
CPC .. H02K 1/20; H02K 5/20; H02K 9/19; H02K 9/193; Y02T 10/64
USPC .......................................................... 310/54
See application file for complete search history.

(56) References Cited

U.S. PATENT DOCUMENTS

| | | | | |
|---|---|---|---|---|
| 6,710,479 B2 * | 3/2004 | Yoshida | ................. | H02K 5/207 310/58 |
| 8,400,029 B2 * | 3/2013 | Sugimoto | ............... | B60L 15/20 310/58 |
| 9,431,879 B2 * | 8/2016 | Kikuchi | .................... | H02K 9/19 |
| 10,778,056 B2 * | 9/2020 | Pal | ............................ | H02K 1/32 |
| 2013/0278092 A1 | 10/2013 | Coldwate et al. | | |
| 2014/0217842 A1 * | 8/2014 | Kikuchi | .................... | H02K 9/19 310/54 |

(Continued)

FOREIGN PATENT DOCUMENTS

| | | |
|---|---|---|
| CN | 108768011 A | 11/2018 |
| CN | 112615445 A | 4/2021 |

(Continued)

OTHER PUBLICATIONS

Chinese Patent Application No. 202210940378.4, Office Action dated Aug. 4, 2023, 11 pages.

(Continued)

*Primary Examiner* — Alex W Mok
(74) *Attorney, Agent, or Firm* — Cozen O'Connor

(57) ABSTRACT

A stator includes a stator core and a stator winding. The stator core includes a plurality of stator teeth and a core oil passage extending in an axial direction. The stator winding is wound on the stator teeth, and a projection of the stator winding and a projection of the core oil passage in the axial direction of the stator are overlapped. The core oil passage includes a spiral first oil passage section, the stator core includes first and second laminations stacked with each other, the first and second laminations have first and second oil holes both passing through the respective laminations along the axial direction, respectively, the first and second oil holes are staggered in a peripheral direction and in partial communication with each other, and at least one first lamination is adjacent to at least one second lamination to define the first oil passage section.

13 Claims, 13 Drawing Sheets

(56) References Cited

U.S. PATENT DOCUMENTS

| | | | |
|---|---|---|---|
| 2018/0054095 A1 | 2/2018 | Dlala et al. | |
| 2018/0375395 A1* | 12/2018 | Yamagishi | H02K 9/197 |
| 2019/0097499 A1* | 3/2019 | Yim | H02K 5/203 |
| 2020/0204044 A1* | 6/2020 | Lee | H02K 1/20 |
| 2020/0244123 A1* | 7/2020 | Kang | H02K 9/19 |
| 2020/0244124 A1* | 7/2020 | Kang | H02K 1/32 |

FOREIGN PATENT DOCUMENTS

| | | |
|---|---|---|
| CN | 113422473 A | 9/2021 |
| CN | 214755963 U | 11/2021 |
| CN | 113824224 A | 12/2021 |
| CN | 113852223 A | 12/2021 |
| CN | 114069915 A | 2/2022 |
| CN | 114598052 A | 6/2022 |
| DE | 102015215762 A1 | 2/2017 |
| JP | 2015231266 A | 12/2015 |
| WO | WO 2021217294 A1 | 11/2021 |

OTHER PUBLICATIONS

Chinese Patent Application No. 202210940378.4, English translation of Office Action dated Aug. 4, 2023, 11 pages.
European Patent Application No. 22210578.5, Search and Opinion dated Aug. 23, 2023, 11 pages.

* cited by examiner

US 12,374,942 B2

STATOR, MOTOR AND VEHICLE

CROSS-REFERENCE TO RELATED APPLICATION

The present application claims the benefit of priority to Chinese Patent Application No. 202210940378.4 filed on Aug. 5, 2022, the contents of which are incorporated herein by reference in their entireties for all purposes.

BACKGROUND

With the continuous development of new energy vehicles, higher requirements are imposed for the driving power of the new energy vehicles. For driving motor of new energy vehicles, the speed, torque density and power density need to be continuously improved while at the same time, the volume of the driving motor is gradually reduced. The higher the speed, the torque density and the power density of the motor, the higher the amount of heat generated. Therefore, the design of the motor for heat dissipation and cooling is essential for reliable, stable and efficient operation of the motor.

SUMMARY

The present disclosure relates to the field of motor technologies, and more particularly, to a stator, a motor and a vehicle.

A stator according to certain embodiments of the present disclosure includes a stator core and a stator winding. The stator core includes a plurality of stator teeth and a core oil passage extending in an axial direction of the stator. The stator winding is wound on the stator teeth, and a projection of the stator winding and a projection of the core oil passage in the axial direction of the stator are at least partially overlapped. The core oil passage includes a spiral first oil passage section, the stator core includes a first lamination and a second lamination stacked with each other, the first lamination has a first oil hole passing through the first lamination along the axial direction of the stator, the second lamination has a second oil hole passing through the second lamination along the axial direction of the stator, the first oil hole and the second oil hole are staggered in a peripheral direction of the stator and in partial communication with each other, and at least one first lamination is adjacent to at least one second lamination to define the first oil passage section.

A motor according to certain embodiments of the present disclosure includes a housing and a stator. The housing has a first housing oil inlet, and the stator is in the housing. The stator includes a stator core and a stator winding. The stator core includes a plurality of stator teeth and a core oil passage extending in an axial direction of the stator. The stator winding is wound on the stator teeth, and a projection of the stator winding and a projection of the core oil passage in the axial direction of the stator are at least partially overlapped. The core oil passage includes a spiral first oil passage section, the stator core includes a first lamination and a second lamination stacked with each other, the first lamination has a first oil hole passing through the first lamination along the axial direction of the stator, the second lamination has a second oil hole passing through the second lamination along the axial direction of the stator, the first oil hole and the second oil hole are staggered in a peripheral direction of the stator and in partial communication with each other, and at least one first lamination is adjacent to at least one second lamination to define the first oil passage section. The core oil passage is in communication with the first housing oil inlet.

Figure 1:
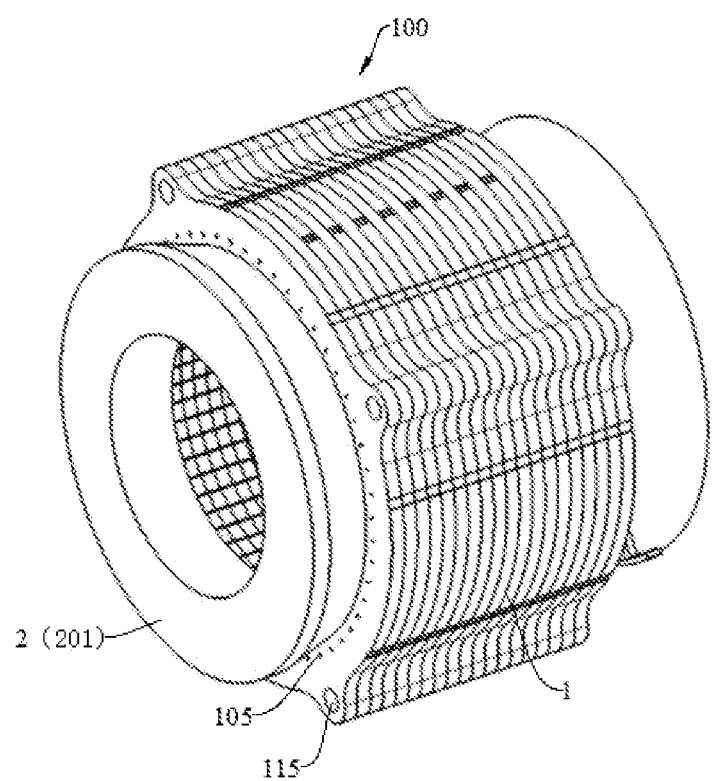
FIG. 1 is a schematic view of a stator according to an embodiment of the present disclosure.
Figure 2:
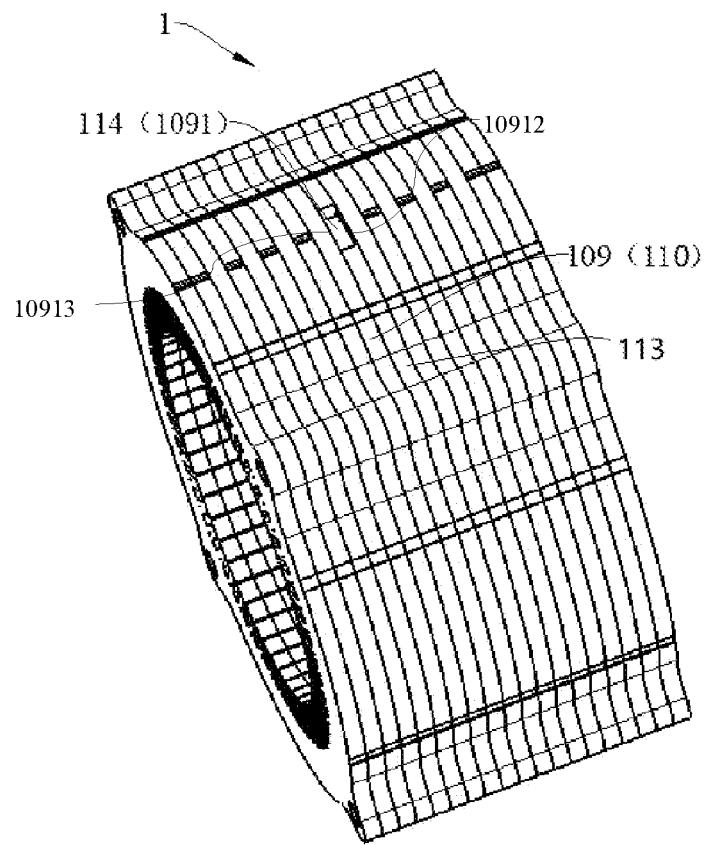
FIG. 2 is a perspective view of the stator core in FIG. 1.
Figure 3:
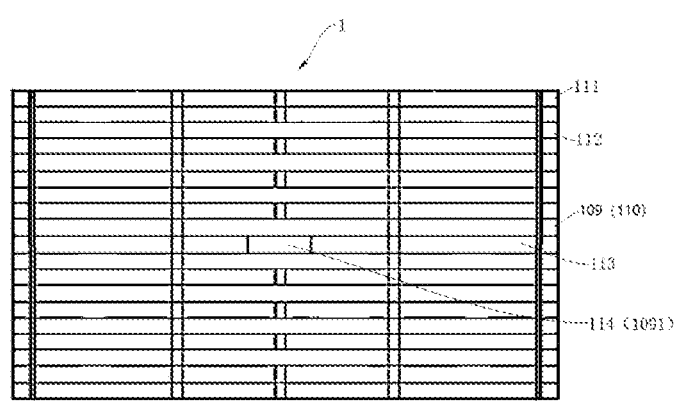
FIG. 3 is a front view of the stator core in FIG. 1.

REFERENCE NUMERALS stator 100;
stator core 1; first oil hole 101; second oil hole 102; first oil passage section 103; second oil passage section 104; core oil outlet 105; first portion 106; second portion 107; third portion 108; inner side portion 1081; outer side portion 1082; first lamination 109; communicating groove 1091; groove side wall 10911; first groove opening 10912; second groove opening 10913; oil-inlet annular groove 1092; first groove wall 10921; second groove wall 10922; first interval 1093; second lamination 110; second interval 1101; fourth lamination 111; fifth lamination 112; third lamination 113;

third interval 1131; core oil inlet 114; coupling hole 115; stator teeth 116; yoke portion 117; third oil hole 118; fourth oil hole 119; fifth oil hole 120; core oil passage 121;

stator winding 2; winding end 201;

motor 1000;

oil spraying ring 3; first oil spraying ring 301; second oil spraying ring 302; accommodating groove 303; groove bottom wall 3031; groove side wall 3032; inner groove wall 30321; outer groove wall 30322; plate 304; axial oil spraying hole 3041; first cavity 3042; first barrel 305; outer oil spraying hole 3051; second cavity 3052; second barrel 306; inner oil spraying hole 3061; third cavity 3062; oil ring channel 307; oil ring inlet 308; fixing portion 309; fixing hole 3091; oil spraying hole 310; radial oil spraying hole 311;

housing 400; first housing oil inlet 401; second housing oil inlet 402.

DETAILED DESCRIPTION

Embodiments of the present disclosure are described in detail below, and examples of embodiments are illustrated in accompanying drawings. The following embodiments described with reference to the accompanying drawings are exemplary and are intended to explain the present disclosure rather than limit the present disclosure.

At present, the cooling mode of motors mainly includes an air cooling mode, a water cooling mode and an oil cooling mode. The air cooling mode can only be applied to the cooling of low performance motors. The water cooling mode has some defects since the cooling water cannot directly contact the parts to be cooled. With the advantages of the natural electrical insulation and the high structural design freedom, the oil cooling mode has become the first choice for cooling a high-performance motor.

Most of the driving motors of new energy vehicles are permanent magnet synchronous motors. The stator of the motor generates a lot of heat, and its main heat is generated by a stator core and a stator winding. If the stator of the motor cannot be effectively cooled, it will directly lead to a low reliability, a low stability and a low efficiency of the motor operation, which will seriously affect reliable and stable operation of the vehicle.

In the related art, a plurality of core oil passages are arranged in the stator core and parallel to an axis of the stator core, such that the stator core is cooled by the cooling oil in the core oil passages. The above core oil passage is parallel to an axial direction of the stator core, resulting in a small contact area between the cooling oil and the stator core and thus a low heat dissipation efficiency of the stator core, which is still not conducive to the reliable and stable operation of the motor and the vehicle having the motor.

The present disclosure aims to solve at least one of the technical problems in the related art to a certain extent.

Therefore, embodiments of the present disclosure propose a stator, to improve the heat dissipation efficiency of the stator.

As illustrated in FIGS. 1 to 15, a stator 100 according to embodiments of the present disclosure includes a stator core 1 and a stator winding 2, and the stator core 1 includes a plurality of stator teeth 116 and a core oil passage 121 extending in an axial direction of the stator 100. The stator winding 2 is wound on the stator teeth 116, and a projection of the stator winding 2 and a projection of the core oil passage 121 in the axial direction of the stator 100 are at least partially overlapped.

The core oil passage 121 includes a spiral first oil passage section 103. The stator core 1 includes a first lamination 109 and a second lamination 110 stacked with each other. The first lamination 109 has a first oil hole 101 passing through the first lamination along the axial direction of the stator 100. The second lamination 110 has a second oil hole 102 passing through the second lamination along the axial direction of the stator 100. The first oil hole 101 and the second oil hole 102 are staggered in a peripheral direction of the stator 100 and in partial communication with each other. At least one first lamination 109 is adjacent to at least one second lamination 110 to define the first oil passage section 103.

The peripheral direction of the stator 100 refers to a circumferential direction surrounding an axis of the stator 100.

The projection of the stator winding 2 and the projection of the core oil passage 121 in the axial direction of the stator 100 are at least partially overlapped, such that cooling oil in the core oil passage 121 is closer to the stator winding 2, which can realize the cooling and heat dissipation for the stator winding 2.

Assuming that a flow area of the first oil hole 101 is S1, a flow area of the second oil hole 102 is S2, and a flow area at a communicating portion of the first oil hole 101 and the second oil hole 102 is S0, the first oil hole 101 and the second oil hole 102 are staggered in the peripheral direction of the stator 100 and in partial communication with each other, such that S0 is greater than S1, and S0 is greater than S2. When the cooling oil flows from the first oil hole 101 of the first lamination 109 to the second oil hole 102 of the second lamination 110, part of the cooling oil is blocked by the second lamination 110 and comes into contact with a portion of the second lamination 110 that is not a hole wall of the second oil hole 102, thus increasing the contact area between the cooling oil and the second lamination 110. Similarly, when the cooling oil flows from the second oil hole 102 of the second lamination 110 to the first oil hole 101 of the first lamination 109, part of the cooling oil is blocked by the first lamination 109 and comes into contact with a portion of the first lamination 109 that is not a hole wall of the first oil hole 101, thus increasing the contact area between the cooling oil and the first lamination 109.

In the stator 100 according to embodiments of the present disclosure, the core oil passage 121 extending in the axial direction of the stator 100 includes the spiral first oil passage section 103, such that the contact area between the cooling oil and the stator core 1 is increased compared with the related art in which the core oil passage 121 of the stator core is parallel to the axial direction of the stator core, thus improving the heat dissipation efficiency of the stator 100 and facilitating the reliable operation of the motor having the stator 100.

Therefore, the stator 100 according to embodiments of the present disclosure has advantages of high heat dissipation efficiency and so on.

In some examples, a projection of at least one of the first oil hole 101 and the second oil hole 102 in the axial direction of the stator 100 has a circular shape, a rectangular shape, a T-shape or a cross-shape.

A projection of at least one of the first oil hole 101 and the second oil hole 102 in the axial direction of the stator 100 has a circular shape, a rectangular shape, a T-shape or a cross-shape, which can be understood as: a projection of the first oil hole 101 in the axial direction of the stator 100 has a circular shape, a rectangular shape, a T-shape or a cross-shape, and a projection of the second oil hole 102 in the axial direction of the stator 100 has a shape other than any of the circular shape, the rectangular shape, the T-shape and the cross-shape; or, the projection of the second oil hole 102 in the axial direction of the stator 100 has a circular shape, a rectangular shape, a T-shape or a cross-shape, and the projection of the first oil hole 101 in the axial direction of the stator 100 has a shape other than any of the circular shape, the rectangular shape, the T-shape and the cross-shape; or, each of the projection of the first oil hole 101 and the projection of the second oil hole 102 in the axial direction of the stator 100 has a circular shape, a rectangular shape, a T-shape or a cross-shape.

Figure 4:
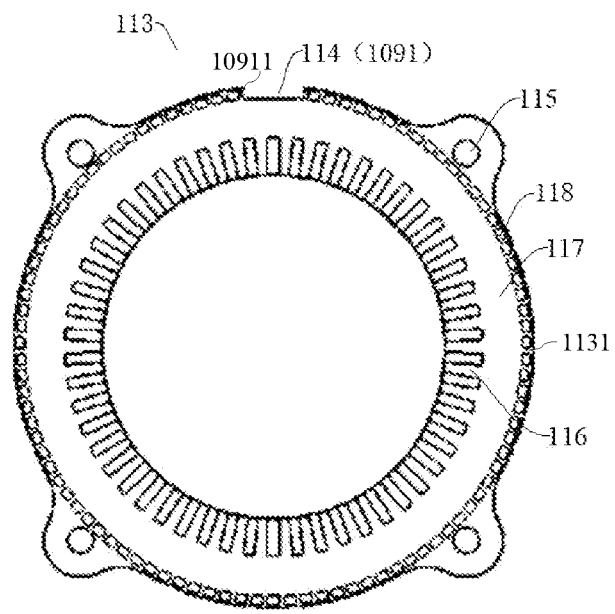
FIG. 4 is a schematic view of a third lamination in FIG. 3.
Figure 5:
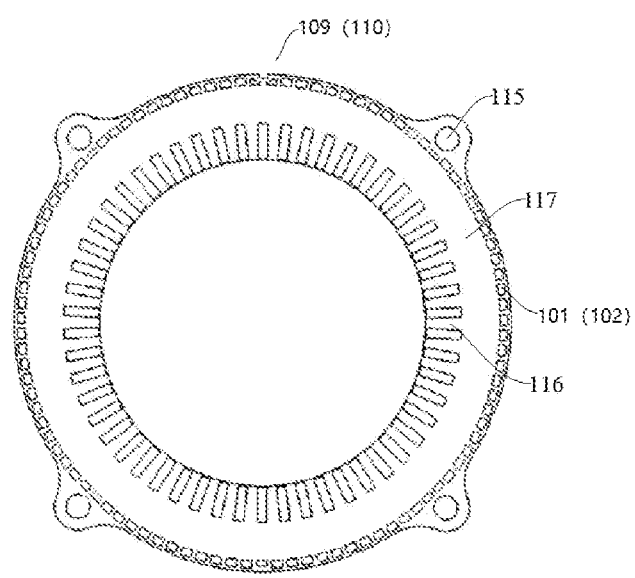
FIG. 5 is a schematic view of a first lamination (a second lamination) in FIG. 3.

For example, as illustrated in FIGS. 4 and 5, each of the projection of the first oil hole 101 and the projection of the second oil hole 102 in the axial direction of the stator 100 has a rectangular shape.

The projection of at least one of the first oil hole 101 and the second oil hole 102 in the axial direction of the stator 100 has the circular shape, the rectangular shape, the T-shape or the cross-shape, such that it is convenient to process and manufacture the first oil hole 101 and the second oil hole 102, which is conducive to reducing the cost of the stator 100 according to embodiments of the present disclosure.

In some examples, a plurality of first laminations 109 and a plurality of second laminations 110 are provided, and at least part of the first laminations 109 and at least part of the second laminations 110 are sequentially and alternately arranged along the axial direction of the stator 100 to define the first oil passage section 103.

Figure 8:
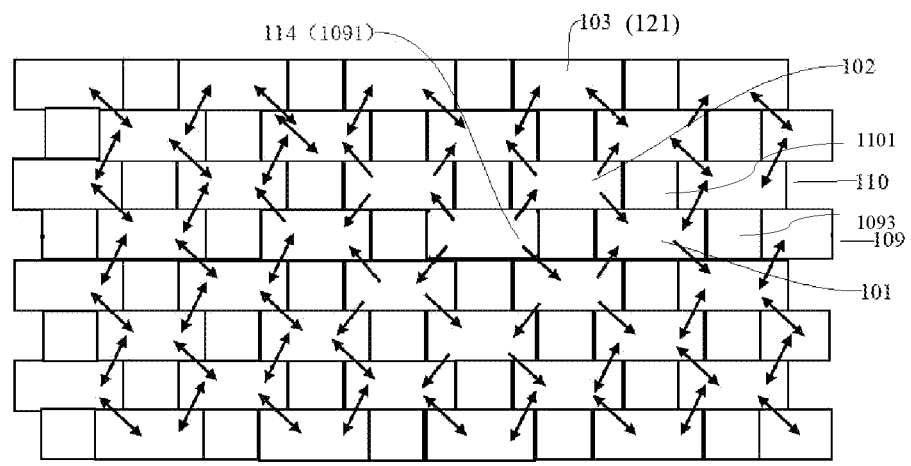
FIG. 8 is a partial schematic view of a core oil passage of a stator core in FIG. 3.

For example, as illustrated in FIG. 8, a plurality of first laminations 109 and a plurality of second laminations 110 are provided, and the number of the first laminations 109 and the number of the second laminations 110 are equal. The plurality of first laminations 109 and the plurality of the second laminations 110 are sequentially and alternately arranged along the axial direction of the stator 100 to define the first oil passage section 103.

The plurality of first laminations 109 and the plurality of the second laminations 110 are sequentially and alternately arranged along the axial direction of the stator 100 to define the first oil passage section 103, such that a length of the first oil passage section 103 is longer, and hence the contact area between the cooling oil and the stator core 1 is larger, thus further improving the heat dissipation efficiency of the stator core 1.

In some embodiments, the core oil passage 121 further includes a second oil passage section 104.

In some examples, a part of the first laminations 109 are sequentially adjacent along the axial direction of the stator 100, and the first oil holes 101 of the adjacent first laminations 109 are aligned in the peripheral direction of the stator 100 to define the second oil passage section 104.

Figure 12:
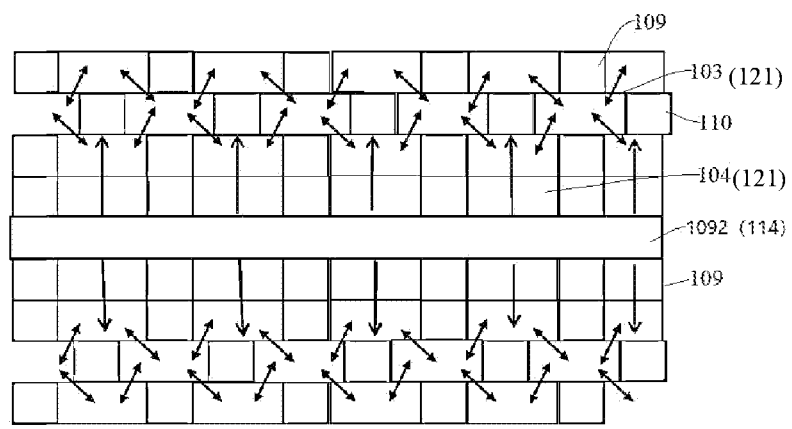
FIG. 12 is a partial schematic view of a core oil passage of the stator core in FIG. 11.

For example, as illustrated in FIG. 12, a part of the first laminations 109 and a part of the second laminations 110 are sequentially and alternately arranged along the axial direction of the stator 100 to define the first oil passage section 103, and another part of the second laminations 109 are sequentially adjacent along the axial direction of the stator 100 to define a straight through second oil passage section 104.

It can be understood that compared with the spiral first oil passage section 103, the straight through second oil passage section 104 has a smaller flow resistance for the cooling oil, which is conducive to the rapid flow of the cooling oil. Compared with in the straight through second oil passage section 104, in the spiral first oil passage section 103 the cooling oil has a higher heat dissipation efficiency for the stator core 1.

In some examples, a part of the second laminations 110 are sequentially adjacent, and the second oil holes 102 of the adjacent second laminations 110 are aligned in the peripheral direction of the stator 100 to define the second oil passage section 104.

The core oil passage 121 includes the first oil passage section 103 and the second oil passage section 104, such that the heat dissipation efficiency of the stator core 1 and the flow rate of the cooling oil can be balanced by setting the length of the first oil passage section 103 and the length of the second oil passage section 104.

In some examples, a plurality of first oil passage sections 103 are provided, and at least one second oil passage section 104 is between two adjacent first oil passage sections 103 in the axial direction of the stator 100.

For example, as illustrated in FIG. 12, two first oil passage sections 103 are provided, and the second oil passage section 104 is between the two first oil passage sections 103 in the axial direction of the stator 100.

In some examples, a plurality of second oil passage sections 104 are provided, and at least one first oil passage section 103 is between two adjacent second oil passage sections 104 in the axial direction of the stator 100.

The plurality of first oil passage sections 103 are provided, and at least one second oil passage section 104 is between two adjacent first oil passage sections 103; or, the plurality of second oil passage sections 104 are provided, and at least one first oil passage section 103 is between two adjacent second oil passage sections 104, such that the heat dissipation efficiency of the stator core 1 and the flow rate of the cooling oil can be balanced by setting the number and the relative position of the first oil passage sections 103 and the second oil passage sections 104.

In some embodiments, the core oil passage 121 passes through the stator core 1 along the axial direction of the stator 100, and at least one port of the core oil passage 121 defines a core oil outlet 105. The stator winding 2 includes a winding end 201, and the winding end 201 is at a side of the stator core 1 in the axial direction of the stator 100. A projection of the core oil outlet 105 and the projection of the winding end in the axial direction of the stator 100 are at least partially overlapped.

For example, as illustrated in FIGS. 1, 9, 11 and 15, the stator 100 includes the stator winding 2, the stator winding 2 has the winding end 201, and the winding end 201 is at a side of the stator core 1 in the axial direction of the stator 100. The projection of the core oil outlet 105 and the projection the winding end 201 in the axial direction of the stator 100 are at least partially overlapped, such that the cooling oil flowing from the core oil outlet 105 may be sprayed to the winding end 201, thus realizing the cooling and heat dissipation of the winding end 201, and improving the utilization rate of the cooling oil and the heat dissipation efficiency of the stator 100.

In some examples, the core oil passage 121 includes a first portion 106 and a second portion 107 arranged along the axial direction of the stator 100, the first portion 106 is closer to the axis of the stator 100 than the second portion 107 in the axial direction of the stator 100, and the core oil outlet 105 is arranged in the second portion 107.

Figure 9:
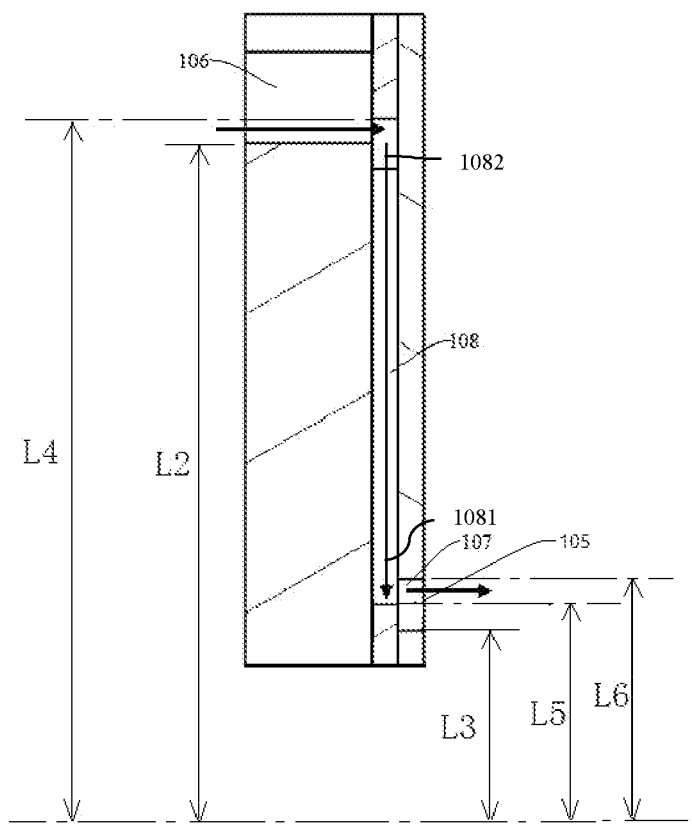
FIG. 9 is a schematic view of a first portion, a second portion and a third portion of a core oil passage of a stator core in FIG. 3.
Figure 10:
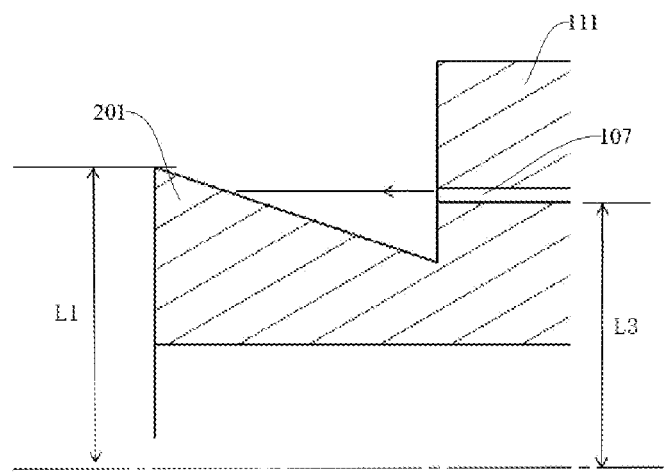
FIG. 10 is a schematic view of an end of a stator winding in FIG. 1.

In some examples, as illustrated in FIG. 9, the first portion 106 is father away from the axis of the stator 100 than the second portion 107.

For example, as illustrated in FIGS. 1, 9, 11 and 15, the stator 100 includes the stator winding 2, the stator winding 2 has the winding end 201, and the winding end 201 is at a side of the stator core 1 in the axial direction of the stator 100. Assuming that a maximum distance between an outer side of the winding end 201 and the axis of the stator 100 is L1, a minimum distance between the first portion 106 and the axis of the stator 100 is L2, and a minimum distance between the second portion 107 and the axis of the stator 100 is L3, L2 is greater than L1, and L3 is less than L1, such that the first portion 106 is closer to the axis of the stator 100 than the second portion 107 in the axial direction of the stator 100.

Therefore, when the cooling oil in the core oil passage 121 flows from the core oil outlet 105 of the second portion 107, the cooling oil may be sprayed to the winding end 201 of the stator winding 2 along the axial direction of the stator 100 to realize the cooling and heat dissipation of the winding end 201, thus further improving the utilization rate of the cooling oil and the heat dissipation efficiency of the stator 100.

In some examples, the stator core 1 includes a yoke portion 117 and stator teeth 116 coupled to each other. The first portion 106 is in the yoke portion 117, and at least part of the second portion 107 is in the stator teeth 116.

At least part of the second portion 107 is in the stator teeth 116, which can be understood as: a part of the second portion 107 is in the yoke portion 117, and the other part of the second portion 107 is in the stator teeth 116; or, the second portion 107 is wholly in the stator teeth 116.

It can be understood that, in order to better cooling the winding end 201, the whole core oil passage 121 is generally arranged at a position close to the stator teeth 116, or even in the stator teeth 116. The setting position of the core oil passage 121 will affect the electromagnetic performance of the stator 100, and thus affect the performance of the motor.

In the stator 100 according to embodiments of the present disclosure, the core oil passage 121 includes the first portion 106 and the second portion 107, the first portion 106 is in the yoke portion 117, and at least part of the second portion 107 is in the stator teeth 116, such that the cooling oil from the core oil outlet 105 may be sprayed to the winding end 201 to cooling the winding end 201, while avoiding that the core oil passage 121 is too close to the stator teeth 116, which is conducive to improving the electromagnetic performance of the stator 100 and thus the performance of the motor.

In some examples, the first portion 106 and the second portion 107 are staggered in a radial direction of the stator 100. The core oil passage 121 further includes a third portion 108, and the third portion 108 is between the first portion 106 and the second portion 107 in the axial direction of the stator 100. The first portion 106 is in communication with the second portion 107 through the third portion 108.

For example, as illustrated in FIG. 9, the first portion 106 is at an outer side of the second portion 107, an outer end of the third portion 108 is in communication with the first portion 106, and an inner end of the third portion 108 is in communication with the second portion 107. The third portion 108 is utilized to realize the communication of the first portion 106 and the second portion 107. Inner refers to a side close to the axis of the stator 100 on a plane perpendicular to the axis of the stator 100, and outer refers to a side away from the axis of the stator 100 on the plane perpendicular to the axis of the stator 100.

Assuming that a minimum distance between the first portion 106 and the axis of the stator 100 is L2, a distance between the outer end of the third portion 108 and the axis of the stator 100 is L4, a distance between the inner end of the third portion 108 and the axis of the stator 100 is L5, and a maximum distance between the second portion 107 and the axis of the stator 100 is L6, L4 is greater than L2, and L5 is less than L6, such that the communication of the first portion 106 and the second portion 107 is realized through the third portion 108.

The first portion 106 and the second portion 107 are staggered in the radial direction of the stator 100, such that it is convenient to arrange the first portion 106 farther away from the stator teeth 116, which is conducive to improving the electromagnetic performance of the stator 100 and thus the performance of the motor. The communication of the first portion 106 and the second portion 107 is conveniently realized by arrangement of the third portion 108.

In some examples, a part of the third portion 108 is in the yoke portion 117, and the other part of the third portion 108 is in the stator teeth 116.

For example, the third portion 108 includes an inner side portion 1081 and an outer side portion 1082, the inner side portion 1081 is in the stator teeth 116 and the outer side portion 1082 is in the yoke portion 117.

A part of the third portion 108 is in the yoke portion 117, and the other part of the third portion 108 is in the stator teeth 116, such that the third portion 108 is arranged farther away from the stator teeth 116 under the condition that the communication of the first portion 106 and the second portion 107 is realized through the third portion 108 conveniently, which is conducive to improving the electromagnetic performance of the stator 100 and thus the performance of the motor.

In some examples, the first portion 106 includes at least one of the first oil passage section 103 and the second oil passage section 104.

The first portion 106 includes at least one of the first oil passage section 103 and the second oil passage section 104, which can be understood as: the first portion 106 only includes the first oil passage section 103, and does not include the second oil passage section 104; or, the first portion 106 only includes the second oil passage section 104, and does not include the first oil passage section 103; or, the first portion 106 includes both the first oil passage section 103 and the second oil passage section 104.

In some examples, a plurality of core oil passages 121 are provided, and the plurality of core oil passages 121 are arranged along the peripheral direction of the stator 100. Each of the core oil passages 121 includes the first oil passage section 103, and first oil passage sections 103 of the plurality of core oil passages 121 are in communication with each other.

The plurality of core oil passages 121 are arranged along the peripheral direction of the stator 100, such that the cooling oil may be supplied to the plurality of core oil passages 121, and the cooling oil in the plurality of core oil passages 121 may be used for heat exchange with the stator core 1, which is conducive to improving the heat dissipation efficiency of the stator core 1. The first oil passage sections 103 of the plurality of core oil passages 121 are in communication with each other, such that the cooling oil can be supplied to the plurality of core oil passages 121 through one core oil inlet 114 in communication with one of the first oil passage sections 103, thus facilitating the supply of oil to the plurality of core oil passages 121.

In some examples, a plurality of first oil holes 101 are provided in each first lamination 109, and the plurality of first oil holes 101 in a same first lamination 109 are spaced apart along the peripheral direction of the stator 100. A first interval 1093 is defined between two adjacent first oil holes 101 in the same first lamination 109. A plurality of second oil holes 102 are provided in each second lamination 110, and the plurality of second oil holes 102 in a same second lamination 110 are spaced apart along the peripheral direction of the stator 100. A second interval 1101 is defined between two adjacent second oil holes 102 in the same second lamination 110.

In the peripheral direction of the stator 100, a size of the first interval 1093 is smaller than a size of the second oil hole 102, and a size of the second interval 1101 is smaller than a size of the first oil hole 101. In the first oil passage section 103, each first interval 1093 is arranged corresponding to an adjacent second oil hole 102 in the peripheral direction of the stator 100, and each second interval 1101 is arranged corresponding to an adjacent first oil hole 101 in the peripheral direction of the stator 100.

It can be understood that, in the peripheral direction of the stator 100, the size of the first interval 1093 is smaller than the size of the second oil hole 102, the size of the second interval 1101 is smaller than the size of the first oil hole 101, and in the first oil passage section 103, each first interval 1093 is arranged corresponding to the adjacent second oil hole 102 in the peripheral direction of the stator 100, and each second interval 1101 is arranged corresponding to the adjacent first oil hole 101 in the peripheral direction of the stator 100, such that each first oil hole 101 is in communication with two adjacent second oil holes 102 in the same second lamination 110, and each second oil hole 102 is in communication with two adjacent first oil holes 101 in the same first lamination 109. Therefore, the first oil passage sections 103 of the plurality of core oil passages 121 are in communication with each other.

For example, as illustrated in FIGS. 8 and 12, in the peripheral direction of the stator 100, the size of the first interval 1093 is smaller than the size of the first oil hole 101 and the size of the second oil hole 102, and the size of the second interval 1101 is smaller than the size of the first oil hole 101 and the size of the second oil hole 102, such that each first oil hole 101 is in communication with two adjacent second oil holes 102, and each second oil hole 102 is in communication with two adjacent first oil holes 101, and hence the first oil passage sections 103 of the plurality of core oil passages 121 are in communication with each other.

Through the design of the first lamination 109 and the second lamination 110 described above, it is not only convenient to realize the communication of the first oil passage sections 103 of the plurality of core oil passages 121, but also conducive to further improving the contact area between the cooling oil and the stator core 1, thus further improving the heat dissipation efficiency of the stator core 1.

In some examples, the first lamination 109 and the second lamination 110 have an identical structure, and the first lamination 109 and the second lamination 110 adjacent to each other are staggered at a preset angle in the peripheral direction of the stator 100 to define the first oil passage section 103.

For example, as illustrated in FIGS. 8 and 12, in the peripheral direction of the stator 100, the size of the first interval 1093 and the size of the second interval 1101 are identical, the size of the first oil hole 101 and the size of the second oil hole 102 are identical, and each first oil hole 101 is located at a middle of two adjacent second oil holes 102.

The first lamination 109 and the second lamination 110 have the identical structure, such that only a same type of laminations needs to be designed and manufactured, and the first oil passage section 103 may be formed by stacking the laminations, which is convenient for the design and manufacture of the stator core 1 and is conducive to reducing the cost of the stator core 1.

In some examples, each of two ports of the core oil passage 121 defines the core oil outlet 105. The stator core 1 has the core oil inlet 114 in communication with the core oil passage 121. The core oil inlet 114 is located between two core oil outlets 105 of the core oil passage 121 in the axial direction of the stator 100.

A position of the core oil inlet 114 in the axial direction of the stator 100 depends on the uniformity requirement of the stator 100 for the cooling oil flow at two ends of the stator 100. Alternatively or additionally, when the cooling oil flow at two ends of the stator 100 is required to be uniform, the core oil inlet 114 is in the middle of the stator core 1. For other scenarios, the core oil inlet 114 may be arranged close to a side in the axial direction of the stator 100 according to the actual requirement.

Therefore, the core oil inlet 114 is between the two core oil outlets 105 of the core oil passage 121, such that it is convenient to set the position of the core oil inlet 114 according to the cooling requirement of the stator 100, thus achieving the cooling and heat dissipation of the stator 100 more effectively.

In some examples, at least one core oil inlet 114 is arranged close to a side of the stator core 1 in the axial direction of the stator 100.

At least one core oil inlet 114 is arranged close to a side of the stator core 1 in the axial direction of the stator 100, which can be understood as: when one core oil inlet 114 is provided, the core oil inlet 114 is arranged close to a side of the stator core 1 in the axial direction of the stator 100; when a plurality of core oil inlets 114 are provided, each of the plurality of core oil inlets 114 may be arranged close to a side of the stator core 1 in the axial direction of the stator 100, or a part of the plurality of core oil inlets 114 may be arranged close to a side of the stator core 1 in the axial direction of the stator 100, and the other part of the plurality of core oil inlets 114 are located in the middle of the stator core 1 in the axial direction of the stator 100.

Figure 13:
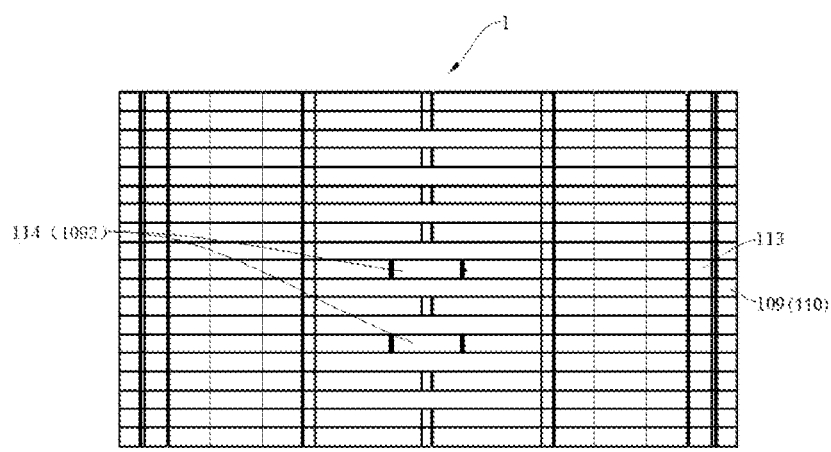
FIG. 13 is a schematic view of a stator core in a stator according to still another embodiment of the present disclosure.
Figure 14:
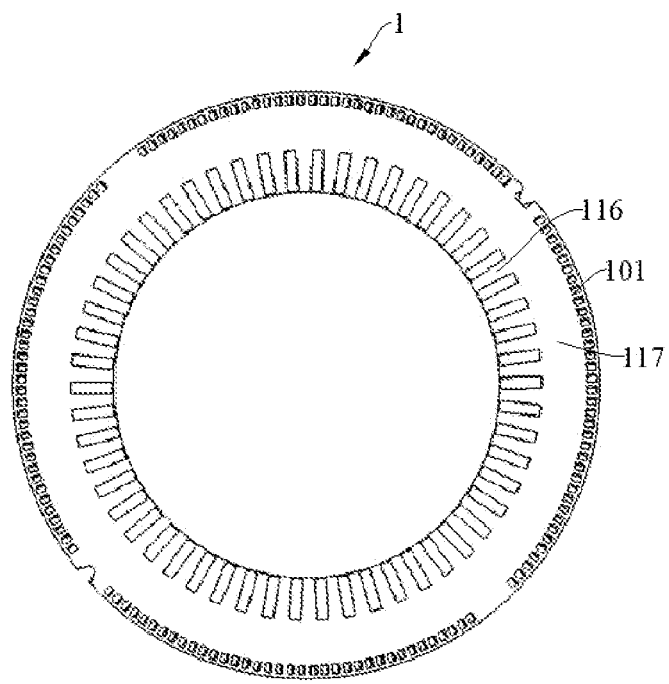
FIG. 14 is a schematic view of a stator core in a stator according to yet another embodiment of the present disclosure.

As illustrated in FIG. 13, two core oil inlets 114 are provided, one of the two core oil inlets 114 is in the middle of the stator core 1 in the axial direction of the stator 100, and the other of the two core oil inlets 114 is arranged close to a side of the stator core 1 in the axial direction of the stator 100.

In some examples, at least one core oil inlet 114 is a middle oil inlet, and the middle oil inlet is equidistant from the two core oil outlets 105 of the core oil passage 121 in the axial direction of the stator 100.

At least one core oil inlet 114 is a middle oil inlet, which can be understood as: when one core oil inlet 114 is provided, the core oil inlet 114 is the middle oil inlet; when a plurality of core oil inlets 114 are provided, each of the plurality of core oil inlets 114 may be the middle oil inlet, or a part of the plurality of core oil inlets 114 may be middle oil inlets, and the other part of the plurality of core oil inlets 114 are arranged close to a side of the stator core 1 in the axial direction of the stator 100.

As illustrated in FIGS. 2, 3, 11 and 13, one core oil inlet 114 is provided, the one core oil inlet 114 is the middle oil inlet, and the middle oil inlet is in the middle of the stator core 1 in the axial direction of the stator 100. As illustrated in FIG. 13, two core oil inlets 114 are provided, one of the two core oil inlets 114 is the middle oil inlet, and the middle oil inlet is in the middle of the stator core 1 in the axial direction of the stator 100.

In some embodiments, as illustrated in FIGS. 1, 2, 3 and 13, the core oil inlet 114 is an oil inlet groove 1091 with an opening facing outwards, and the oil inlet groove 1091 has groove side walls 10911 opposite to each other in the peripheral direction of the stator 100.

In some examples, the stator core 1 further includes a third lamination 113, and the third lamination 113 is stacked with the first lamination 109 and the second lamination 110. The third lamination 113 has a communicating groove passing through the third lamination 113 along the axial direction of the stator 100, and the communicating groove defines the oil inlet groove 1091.

For example, as illustrated in FIG. 4, the stator core 1 further includes the third lamination 113, and the third lamination 113 has the communicating groove passing through the third lamination 113 along the axial direction of the stator 100. The communicating groove has a first groove opening 10912 and a second groove opening 10913 opposite to each other in the axial direction of the stator 100. As illustrated in FIGS. 1, 2, 3, 4 and 13, the third lamination 113 is stacked with the first lamination 109 and the second lamination 110, the first groove opening 10912 of the communicating groove is in communication with the first oil hole 101 of the first lamination 109, and the second groove opening 10913 of the communicating groove is in communication with the second oil hole 102 of the second lamination 110.

It should be noted that the oil inlet groove 1091 may be defined by one communicating groove or a plurality of communicating grooves. When the oil inlet groove 1091 is defined by one communicating groove, the communicating groove is the oil inlet groove 1091; when the oil inlet groove 1091 is defined by a plurality of communicating grooves, the stator core 1 further includes a plurality of third laminations 113, and the plurality of third laminations 113 are stacked with each other sequentially. The communicating grooves in the plurality of third laminations 113 are aligned in the peripheral direction of the stator 100, such that the plurality of communicating grooves define the oil inlet groove 1091. At this time, the communicating grooves of the third laminations 113 located at two ends in the axial direction of the stator 100 are in communication with the first oil hole 101 of the first lamination 109 and the second oil hole 102 of the second laminate on 110, respectively.

By providing the third lamination 113 and defining the oil inlet groove 1091 through the communicating groove of the third lamination 113, the third lamination 113 may be selected according to the position of the core oil inlet 114 when assembling the stator core 1, to define the core oil inlet 114. Therefore, it is convenient to design and manufacture the stator core 1, and it is conducive to reducing the cost of the stator core 1.

Figure 11:
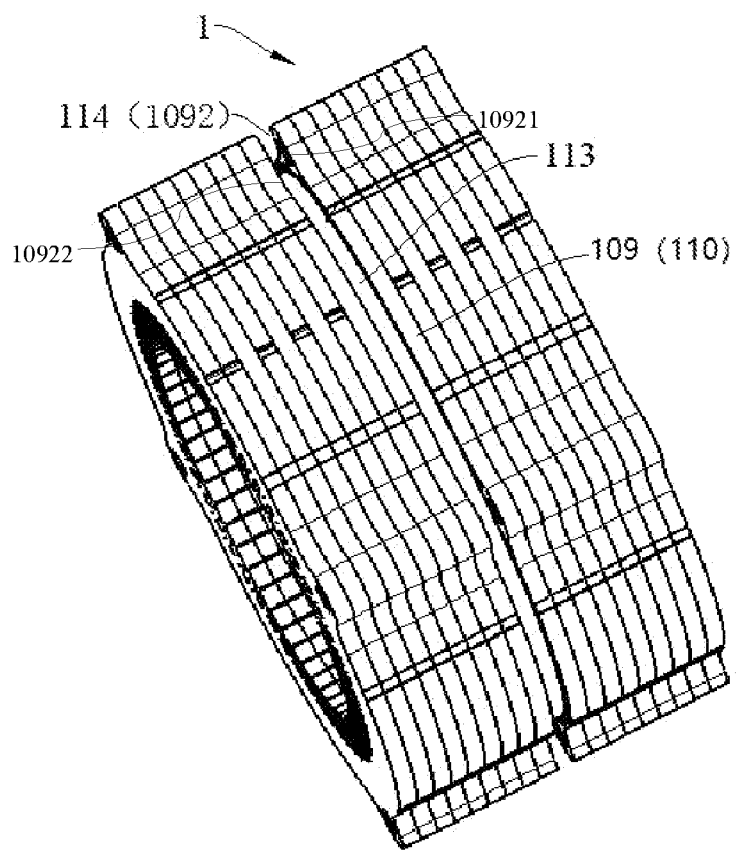
FIG. 11 is a schematic view of a stator core in a stator according to another embodiment of the present disclosure.

In other embodiments, as illustrated in FIG. 11, the core oil inlet 114 is an oil-inlet annular groove 1092 with an opening facing outwards, and the oil-inlet annular groove 1092 surrounds the peripheral direction of the stator 100 and is in communication with the plurality of core oil passages 121.

In some examples, the stator core 1 further includes the third lamination 113, and the third lamination 113 is stacked with the first lamination 109 and the second lamination 110. The third lamination 113 is between the first lamination 109 and the second lamination 110 in the axial direction of the stator 100. An outer diameter of the third lamination 113 is smaller than an outer diameter of the first lamination 109 and an outer diameter of the second lamination 110, such that the third lamination 113, the first lamination 109 and the second lamination 110 define the oil-inlet annular groove 1092.

The oil-inlet annular groove 1092 has a first groove wall 10921 and a second groove wall 10922 opposite to each other in the axial direction of the stator 100. The first oil hole 101 of one first lamination 109 is in the first groove wall 10921, and the second oil hole of one second lamination 110 is in the second groove wall 10922, to communicate the oil-inlet annular groove 1092 with the core oil passage 121.

It should be noted that the oil-inlet annular groove 1092 may be defined by one third lamination 113, one first lamination and one second lamination 110, or defined by a plurality of third laminations 113, one first lamination 109 and one second lamination 110. When the oil-inlet annular groove 1092 is defined by one third lamination 113, one first lamination 109 and one second lamination 110, the third lamination 113 is located between the first lamination 109 and the second lamination 110 in the axial direction of the stator 100. When the oil-inlet annular groove 1092 is defined by a plurality of third laminations 113, one first lamination 109 and one second lamination 110, the plurality of third laminations 113 are located between the first lamination 109 and the second lamination 110 in the axial direction of the stator 100.

Or, the third lamination 113 is between two adjacent first laminations 109 in the axial direction of the stator 100, and the outer diameter of the third lamination 113 is smaller than the outer diameters of the first laminations 109, such that the third lamination 113 and the adjacent two first laminations 109 define the oil-inlet annular groove 1092.

The oil-inlet annular groove 1092 has the first groove wall 10921 and the second groove wall 10922 opposite to each other in the axial direction of the stator 100. The first oil hole 101 of one of the first laminations 109 is in the first groove wall 10921, and the first oil hole 101 of one of the first laminations 109 is in the second groove wall 10922, to communicate the oil-inlet annular groove 1092 with the core oil passage 121.

It should be noted that the oil-inlet annular groove 1092 may be defined by one third lamination 113 and two first laminations, or defined by a plurality of third laminations 113 and two first laminations 109. When the oil-inlet annular groove 1092 is defined by one third lamination 113 and two first laminations 109, the third lamination 113 is located between the two first laminations 109 in the axial direction of the stator 100. When the oil-inlet annular groove 1092 is defined by a plurality of third laminations 113 and two first laminations 109, the plurality of third laminations 113 are located between the two first laminations 109 in the axial direction of the stator 100.

Or, the third lamination 113 is between two adjacent second laminations 110 in the axial direction of the stator 100, and the outer diameter of the third lamination 113 is smaller than the outer diameters of the second laminations 110, such that the third lamination 113 and the two adjacent second laminations 110 define the oil-inlet annular groove 1092.

The oil-inlet annular groove 1092 has the first groove wall 10921 and the second groove wall 10922 opposite to each other in the axial direction of the stator 100. The second oil hole 102 of one of the second laminations 110 is in the first groove wall 10921, and the second oil hole 102 of one of the second laminations 110 is in the second groove wall 10922, to communicate the oil-inlet annular groove 1092 with the core oil passage 121.

It should be noted that the oil-inlet annular groove 1092 may be defined by one third lamination 113 and two second laminations 110, or defined by a plurality of third laminations 113 and two second laminations 110. When the oil-inlet annular groove 1092 is defined by one third lamination 113 and two second laminations 110, the third lamination 113 is located between the two second laminations 110 in the axial direction of the stator 100. When the oil-inlet annular groove 1092 is defined by a plurality of third laminations 113 and two second laminations 110, the plurality of third laminations 113 are located between the two second laminations 110 in the axial direction of the stator 100.

By providing the third lamination 113 and defining the oil-inlet annular groove 1092 through the third lamination 113, the first lamination 109 and the second lamination 110, the third lamination 113 may be selected according to the position of the core oil inlet 114 when assembling the stator core 1, to define the core oil inlet 114. Therefore, it is convenient to design and process the stator core 1, and it is conducive to reducing the cost of the stator core 1.

In some examples, as illustrated in FIG. 4, the third lamination 113 has a plurality of third oil holes 118, and a plurality of third oil holes 118 are provided in each third lamination 113. The plurality of third oil holes 118 in a same third lamination 113 are spaced apart along the peripheral direction of the stator 100, and a third interval 1131 is defined between two adjacent third oil holes 118 in the same third lamination 113. In the peripheral direction of the stator 100, a size of the third interval 1131 and the size of the first interval 1093 are identical, and a size of the third oil hole 118 and the size of the first oil hole 101 are identical. In short, the difference between the third lamination 113 and the first lamination 109 and the second lamination 110 is that the third lamination 113 has a structure configured to define the core oil inlet 114, i.e., compared with the first lamination 109 and the second lamination 110, the third lamination 113 has the communicating groove or the outer diameter of the third lamination 113 is smaller than the outer diameter of the first lamination 109 and the outer diameter of the second lamination 110.

In some examples, the third oil hole 118 and the first oil hole 101 are staggered in the peripheral direction of the stator 100 and in partial communication with each other. Or, the third oil hole 118 and the second oil hole 101 are staggered in the peripheral direction of the stator core 1 and in partial communication with each other. Or, the third oil hole 118 and the first oil hole 101 are aligned in the peripheral direction of the stator 100. Or, the third oil hole 118 and the second oil hole 101 are aligned in the peripheral direction of the stator core 1.

Figure 6:
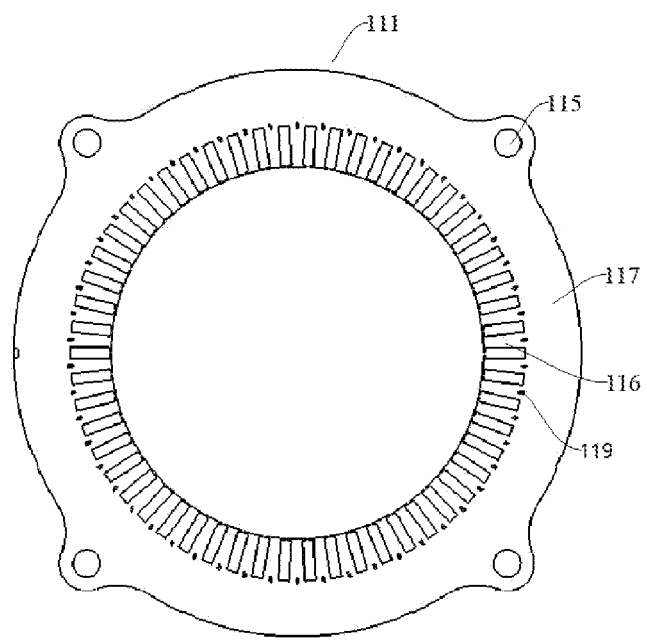
FIG. 6 is a schematic view of a fourth lamination in FIG. 3.

In some examples, the stator core 1 further includes a plurality of fourth laminations 111, and the plurality of fourth laminations 111 are stacked with each other. As illustrated in FIG. 6, the fourth lamination 111 has a plurality of fourth oil holes 119. The plurality of fourth oil holes 119 in a same fourth lamination 111 are spaced apart along the peripheral direction of the stator 100. In the axial direction of the stator 100, the fourth oil holes 119 in adjacent fourth laminations 111 are in one-to-one correspondence and in communication with each other, to define the second portion 107.

In the axial direction of the stator 100, the fourth oil holes 119 in adjacent fourth laminations 111 are in one-to-one correspondence and in communication with each other, which can be understood as: corresponding fourth oil holes 119 are aligned in the peripheral direction of the stator 100, such that the second portion 107 is a straight through type; or, the corresponding fourth oil holes 119 are staggered in the peripheral direction of the stator 100 and in partial communication with each other, such that the second portion 107 is a spiral structure.

Figure 7:
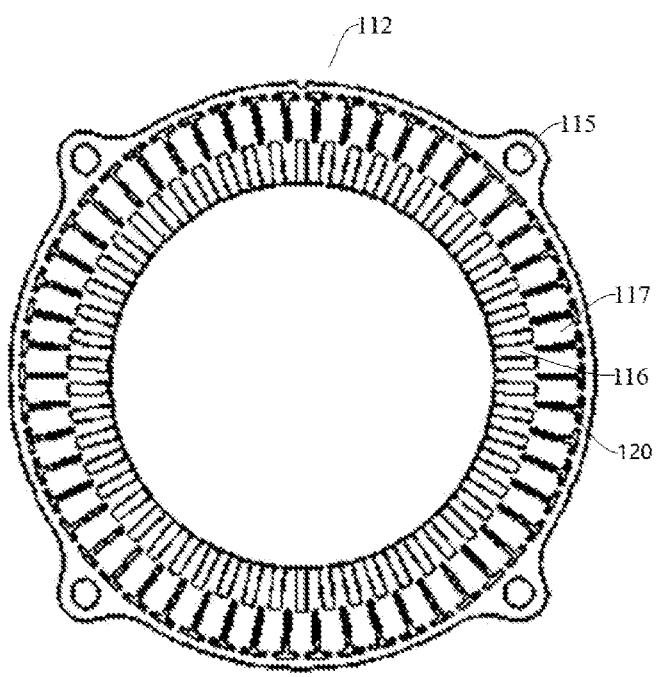
FIG. 7 is a schematic view of a fifth lamination in FIG. 3.

In some examples, the stator core 1 further includes a plurality of fifth laminations 112, and the plurality of fifth laminations 112 are stacked with each other. As illustrated in FIG. 7, the fifth lamination 112 has a plurality of fifth oil holes 120, and the plurality of fifth oil holes 120 in a same fifth lamination 112 are spaced apart along the peripheral direction of the stator 100. In the axial direction of the stator 100, the fifth oil holes 120 in adjacent fifth laminations 112 are in one-to-one correspondence and in communication with each other, to define the third portion 108.

In the axial direction of the stator 100, the fifth oil holes 120 in adjacent fifth laminations 112 are in one-to-one correspondence and in communication with each other, which can be understood as: corresponding fifth oil holes 120 are aligned in the peripheral direction of the stator 100, such that the third portion 108 is a straight through type; or, the corresponding fifth oil holes 120 are staggered in the peripheral direction of the stator 100 and in partial communication with each other, such that the third portion 108 is a spiral structure.

The stator 100 according to embodiments of the present disclosure is composed by stacking and compressing perforated laminations (the first lamination 109, the second lamination 110, the third lamination 113, the fourth lamination 111 and the fifth lamination 112), and the laminations may be reliably coupled by welding, riveting, bonding or other processes. The core oil inlet 114 may be formed by stamping on the lamination, or by other processes such as machining or wire cutting. For the stator core 1 with high heat dissipation requirement, the first portion 106 may only include the first oil passage section 103. For the stator core 1 with low heat dissipation requirement, the first portion 106 may adopt a combined design including the first oil passage section 103 and the second oil passage section 104.

In the stator 100 according to embodiments of the present disclosure, the cooling oil enters along the radial direction of the stator 100, flows through the core oil passage 121 to the core oil outlets 105 at two ends of the stator core 1, and is sprayed out from the core oil outlet 105 to directly cool the winding end 201 of the stator winding 2. Since no other parts are needed to define a closed oil cavity, the design of parts in the system is greatly simplified and the heat dissipation capacity is improved. Both the stator winding 2 and the stator core 1 are fully and evenly cooled, thus effectively reducing the risk of high temperature aging failure of the motor insulation, and improving the power density and torque density of the motor 1000 simultaneously.

Figure 15:
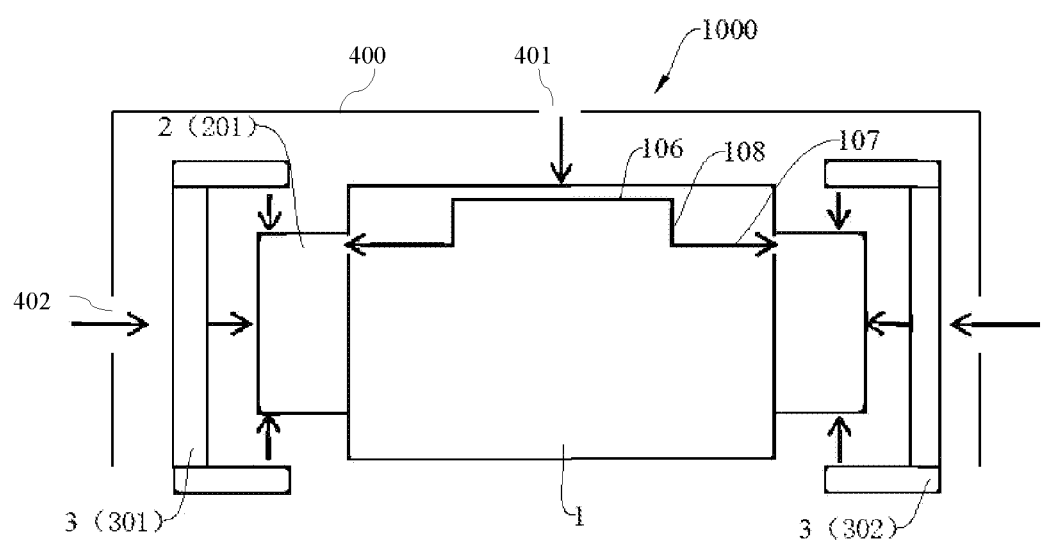
FIG. 15 is a partial schematic view of a motor according to an embodiment of the present disclosure.

As illustrated in FIG. 15, a motor 1000 according to embodiments of the present disclosure includes a housing 400 and a stator 100. The housing 400 has a first housing oil inlet 401, the stator 100 is in the housing 400, the stator 100 is a stator 100 of any of the above described embodiments, and the core oil passage 121 is in communication with the first housing oil inlet 401.

Therefore, the motor 1000 according to embodiments of the present disclosure has advantages of a high reliability and so on.

Specifically, the core oil inlet 114 is in communication with the first housing oil inlet 401, and the cooling oil is supplied through the first housing oil inlet 401 and through the core oil inlet 114 to the core oil passage 121.

The stator 100 and the housing 400 may be fixed by adopting an interference fit, a bolt or a key. For example, as illustrated in FIG. 1, the stator 100 has a coupling hole 115, and the stator 100 is fixedly coupled to the housing 400 through a bolt passing through the coupling hole 115.

In some embodiments, as illustrated in FIG. 15, the motor 1000 further includes an oil spraying ring 3, and the oil spraying ring 3 is in the housing 400. The oil spraying ring 3 is on at least one side of the stator core 1 in the axial direction of the stator 100. The oil spraying ring 3 has an oil ring channel 307, an oil ring inlet 308 and an oil spraying hole 310. Each of the oil ring inlet 308 and the oil spraying hole 310 is in communication with the oil ring channel 307. The oil spraying hole 310 is oriented towards the winding end 201 to spray the cooling oil to the winding end 201. The oil ring inlet 308 is in communication with the core oil passage 121, and/or the housing 400 has a second housing oil inlet 402 in communication with the oil ring inlet 308.

The oil ring inlet 308 is in communication with the core oil passage 121, and/or the housing 400 has a second housing oil inlet 402 in communication with the oil ring inlet 308, which can be understood as: the oil ring inlet 308 is in communication with the core oil passage 121, and the housing 400 does not have a second housing oil inlet 402. At this time, the oil ring inlet 308 is in communication with the core oil passage 121, and the cooling oil may be supplied to the oil ring channel 307 through the core oil passage 121; or, the oil ring inlet 308 is not in communication with the core oil passage 121, but the housing 400 has the second housing oil inlet 402. At this time, the oil ring inlet 308 is in communication with the second housing oil inlet 402, and the cooling oil may be supplied to the oil ring channel 307 through the second housing oil inlet 402; or, the oil ring inlet 308 is in communication with the core oil passage 121, and the housing 400 has the second housing oil inlet 402. At this time, the oil ring inlet 308 is in communication with each of the core oil passage 121 and the second housing oil inlet 402, and the cooling oil may be supplied to the oil ring channel 307 through the second housing oil inlet 402 and the core oil passage 121.

When the winding end 201 needs to be cooled and the heat thereof needs to be dissipated, the cooling oil is supplied to the oil ring channel 307, such that the cooling oil in the oil ring channel 307 may be sprayed to the winding end 201 through the oil spraying hole 310 to cool the winding end 201 and dissipate the heat of the winding end 201.

Therefore, the arrangement of the oil spraying ring 3 can further improve the cooling and heat dissipation effect of the stator 100, which is conducive to further improving the reliability of the motor 1000 having the stator 100.

In some examples, as illustrated in FIG. 15, two oil spraying rings 3 are provided. The two oil spraying rings 3 are a first oil spraying ring 301 and a second oil spraying ring 302, respectively. The first oil spraying ring 301 and the second oil spraying ring 302 are at two sides of the stator core 1 in the axial direction of the stator 100, respectively. The first oil spraying ring 301 may realize the cooling and heat dissipation of the winding end 201 on a side of the stator core 1, and the second oil spraying ring 302 may realize the cooling and heat dissipation of the winding end 201 on the other side of the stator core 1.

In some examples, the first oil spraying ring 301 and the second oil spraying ring 302 have an identical structure and an identical size.

In some examples, the oil spraying ring 3 has an accommodating groove 303 with an opening facing towards the stator core 1, and at least part of the winding end 201 is in the accommodating groove 303. A plurality of oil spraying holes 310 are provided. A part of the plurality of oil spraying holes 310 are an axial oil spraying hole 3041 extending in the axial direction of the stator 100, and the other part of the plurality of oil spraying holes 310 are a radial oil spraying hole 311 extending in the radial direction of the stator 100. The axial oil spraying hole is in a groove bottom wall 3031 of the accommodating groove 303, and the radial oil spraying hole 311 is in the groove side wall 3032 of the accommodating groove 303.

At least part of the winding end 201 is in the accommodating groove 303, which can be understood as: a part of the winding end 201 is in the accommodating groove 303, and the other part of the winding end 201 is outside the accommodating groove 303; or, the winding end 201 is wholly in the accommodating groove 303.

At least part of the winding end 201 is in the accommodating groove 303, and the axial oil spraying hole is in the groove bottom wall 3031 of the accommodating groove 303, such that the cooling oil may be sprayed to the winding end 201 along the axial direction of the stator 100; the radial oil spraying hole 311 is in the groove side wall 3032 of the accommodating groove 303, such that the cooling oil may be sprayed to the winding end 201 along the radial direction of the stator 100, thus realizing the cooling and heat dissipation of many portions of the winding end 201, which is conducive to further improving the cooling and heat dissipation effect of the stator 100 and to further improving the reliability of the motor 1000 having the stator 100.

Figure 16:
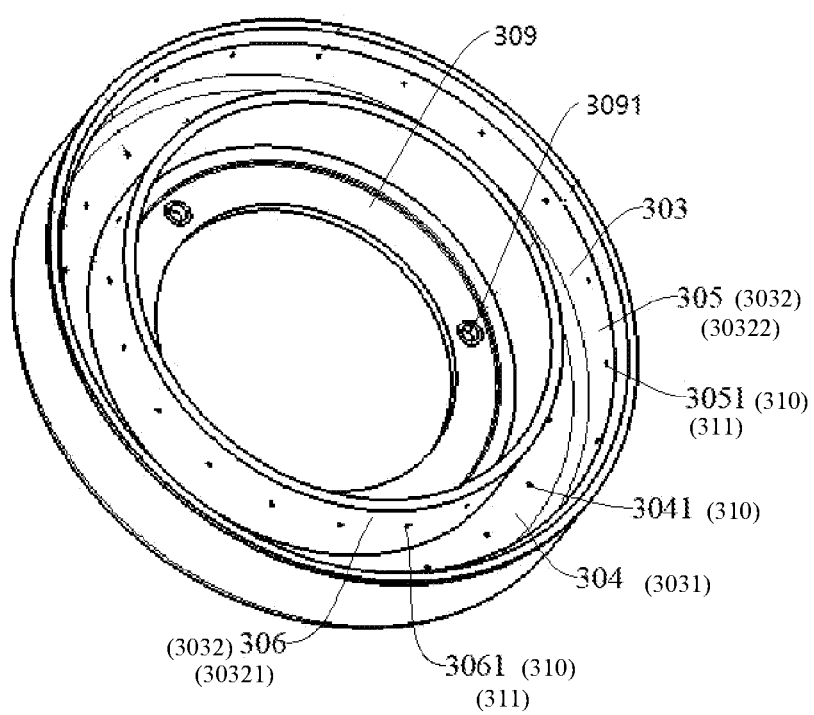
FIG. 16 is a schematic view of an oil spraying ring in FIG. 15.
Figure 17:
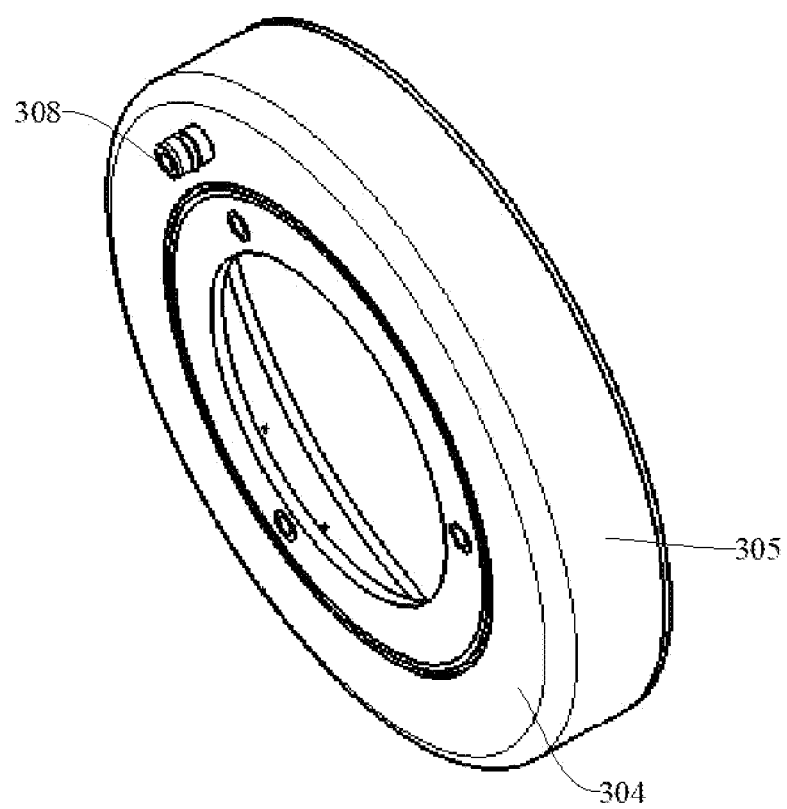
FIG. 17 is a schematic view of an oil spraying ring in FIG. 15 from another view.
Figure 18:
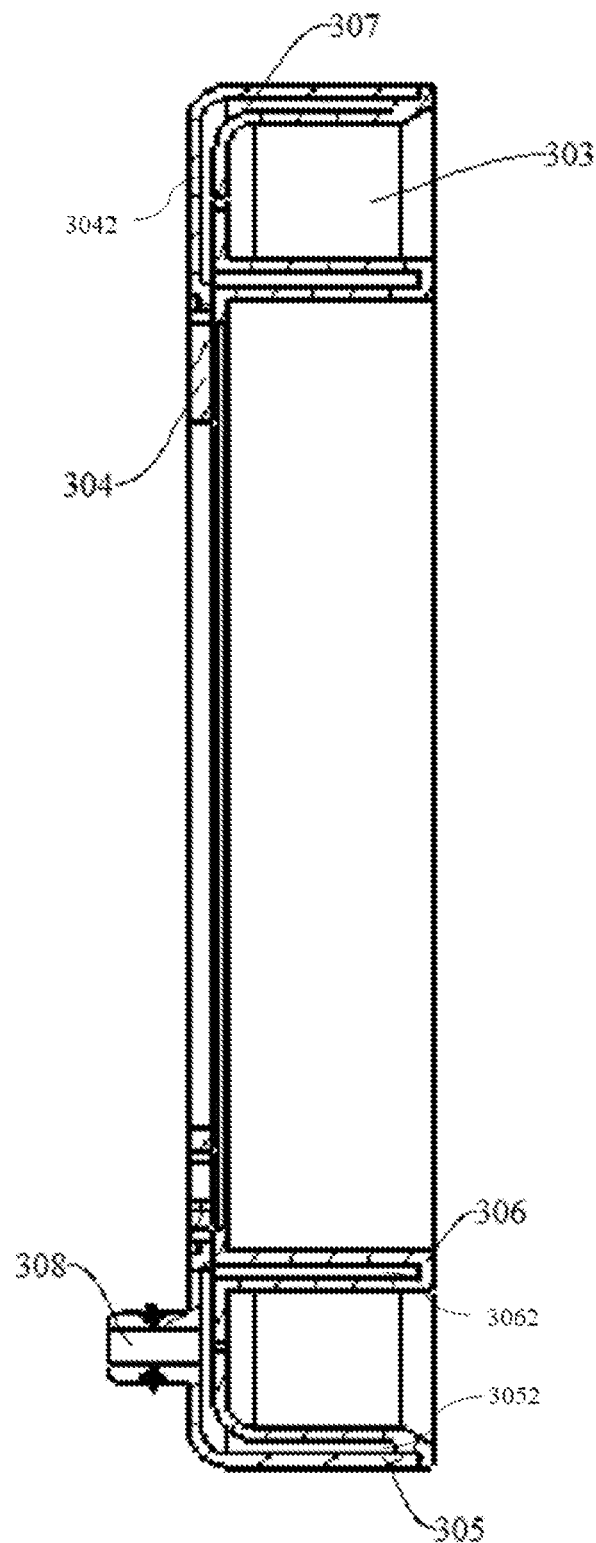
FIG. 18 is a sectional view of an oil spraying ring in FIG. 15.

In some examples, as illustrated in FIGS. 16 to 18, the groove side wall 3032 includes an inner groove wall 30321 and an outer groove wall 30322, the inner groove wall 30321 and the outer groove wall 30322 are spaced apart, and the inner groove wall 30321 is at an inner side of the outer groove wall 30322. A plurality of radial oil spraying holes 311 are provided, a part of the plurality of radial oil spraying holes 311 are an inner oil spraying hole 3061, and the other part of the plurality of radial oil spraying holes 311 are an outer oil spraying hole 3051. The inner oil spraying hole 3061 is in an outer side face of the inner groove wall 30321, and the outer oil spraying hole 3051 is in an inner side face of the outer groove wall 30322.

The inner oil spraying hole 3061 is in the inner groove wall 30321, such that the cooling oil in the oil ring channel may be sprayed to an inner side face of the winding end 201 through the inner oil spraying hole 3061, thus realizing the cooling and heat dissipation of the inner side face of the winding end 201. The outer oil spraying hole 3051 is in the outer groove wall 30322, such that the cooling oil in the oil ring channel may be sprayed to an outer side face of the winding end 201 through the outer oil spraying hole 3051, thus realizing the cooling and heat dissipation of the outer side face of the winding end 201.

Therefore, the design of the plurality of radial oil spraying holes 311 described above can more effectively realize the cooling and heat dissipation of the winding end 201, which is conducive to further improving the cooling and heat dissipation effect of the stator 100 and to further improving the reliability of the motor 1000 having the stator 100.

In some examples, as illustrated in FIG. 16, a plurality of axial oil spraying holes 3041 are provided, and the plurality of axial oil spraying holes 3041 are spaced apart along the peripheral direction of the stator 100. A plurality of outer oil spraying holes 3051 are provided, and the plurality of outer oil spraying holes 3051 are spaced apart along the peripheral direction of the stator 100. A plurality of inner oil spraying holes 3061 are provided, and the plurality of inner oil spraying holes 3061 are spaced apart along the peripheral direction of the stator 100.

By providing a plurality of axial oil spraying holes 3041, a plurality of outer oil spraying holes 3051 and a plurality of inner oil spraying holes 3061, it is convenient to spray the cooling oil to the winding end 201 by 360° along the peripheral direction of the winding end 201, which is conducive to further improving the cooling and heat dissipation effect of the stator 100 and to further improving the reliability of the motor 1000 having the stator 100.

In some examples, each outer oil spraying hole 3051 and adjacent inner oil spraying hole 3061 are staggered in the peripheral direction of the stator 100.

Each outer oil spraying hole 3051 and adjacent inner oil spraying hole 3061 are staggered in the peripheral direction of the stator 100, thus further facilitating the injection of the cooling oil by 360° along the peripheral direction of the winding end 201 to the winding end 201, which is conducive to further improving the cooling and heat dissipation effect of the stator 100 and to further improving the reliability of the motor 1000 having the stator 100.

In some examples, as illustrated in FIGS. 16 to 18, the oil spraying ring 3 includes a first barrel 305, a second barrel 306, and an annular plate 304. Each of the first barrel 305 and the second barrel 306 is coupled to the plate 304. The plate 304, the first barrel 305, and the second barrel 306 define the accommodating groove 303. The first barrel 305 defines the inner groove wall 30321, and the second barrel 306 defines the outer groove wall 30322.

The overall structure of the oil spraying ring 3 is simple, which is convenient for the design and manufacture, and is conducive to reducing the cost of the stator 100.

In some examples, as illustrated in FIG. 18, the plate 304 has a first cavity 3042, the first barrel 305 has a second cavity 3052, and the second barrel 306 has a third cavity 3062. The first cavity 3042, the second cavity 3052 and the third cavity 3062 are in communication with each other, such that the plate 304, the first barrel 305 and the second barrel 306 define the oil ring channel 307. The oil ring inlet 308 is in the plate 304.

The plate 304 is designed to have the first cavity 3042, the first barrel 305 is designed to have the second cavity 3052, and the second barrel 306 is designed to have the third cavity 3062, such that the first cavity 3042, the second cavity 3052, and the third cavity 3062 are in communication with each other to define the oil ring channel, which further facilitates the design and manufacture of the oil spraying ring 3 and is conducive to reducing the cost of the stator 100.

In some examples, the plate 304, the first barrel 305 and the second barrel 306 are coupled by a plastic welding process. In consideration of the cleanliness requirement of parts, the laser welding or the infrared welding is preferred. For the scenario with a low cleanliness requirement, an ultrasonic and vibration friction welding process or other processes may be used.

In some examples, part of the plate 304 is at an inner side of the inner groove wall 30321 to define a fixing portion 309, and the fixing portion 309 has a fixing hole 3091 configured for a fastener to pass through.

For example, as illustrated in FIGS. 16 and 17, part of the plate 304 is located at an inner side of the second barrel 306 to define the fixing portion 309, and the fixing portion 309 has the fixing hole 3091. The oil spraying ring 3 may be fixed to the housing 400 or other components through the fastener passing through the fixing hole 3091. For example, the housing 400 has a threaded hole, and a screw passes through the fixing hole 3091 of the oil spraying ring 3 and is threaded with the threaded hole, thus realizing the fixed mounting of the oil spraying ring 3.

Therefore, by providing the fixing portion 309, the fixed coupling of the oil spraying ring 3 and thus the assembly of the motor 1000 is facilitated.

Of course, in some other embodiments, the oil spraying ring 3 is further fixedly coupled to the stator core 1 through the fastener, or the oil spraying ring 3 may further be fixed to the housing 400 or the stator core 1 by means of a pressing plate or a squeezing fit.

Figure 19:
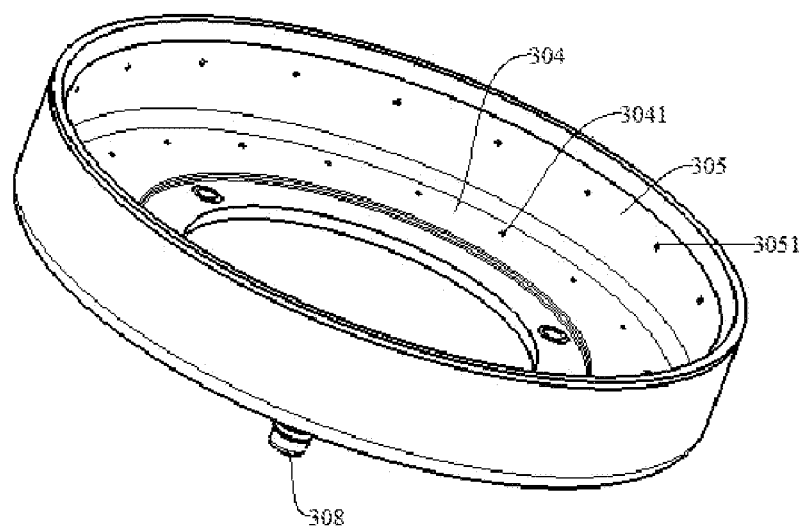
FIG. 19 is a schematic view of an oil spraying ring in a motor according to another embodiment of the present disclosure.
Figure 20:
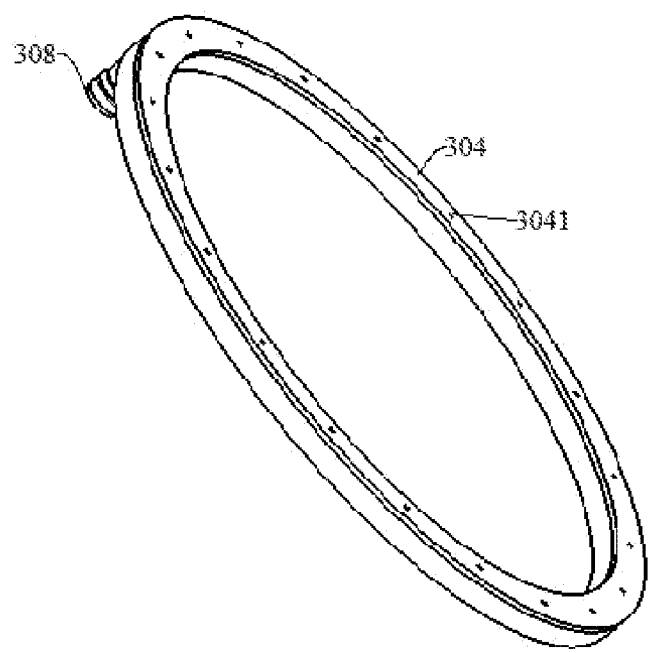
FIG. 20 is a schematic view of an oil spraying ring in a motor according to still another embodiment of the present disclosure.
Figure 21:
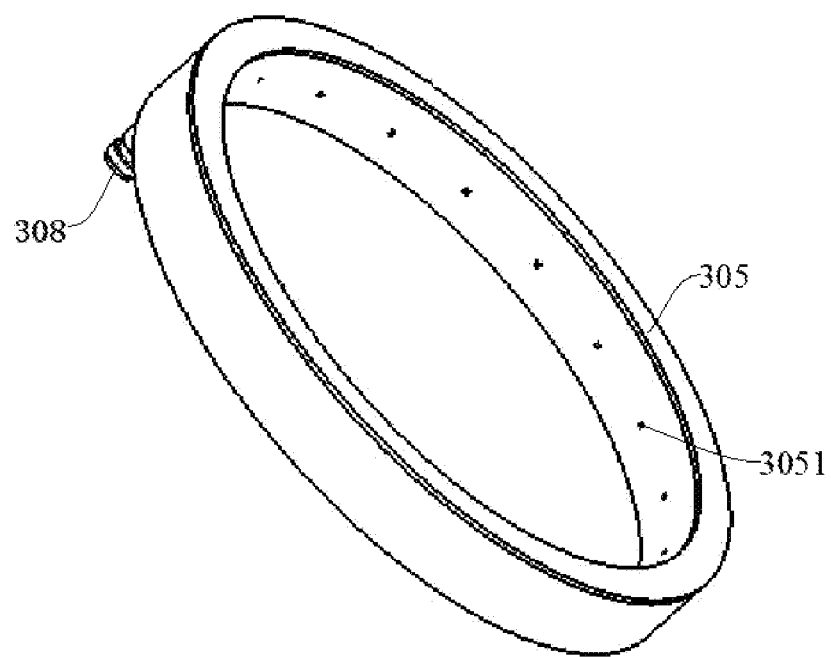
FIG. 21 is a schematic view of an oil spraying ring in a motor according to yet another embodiment of the present disclosure.
Figure 22:
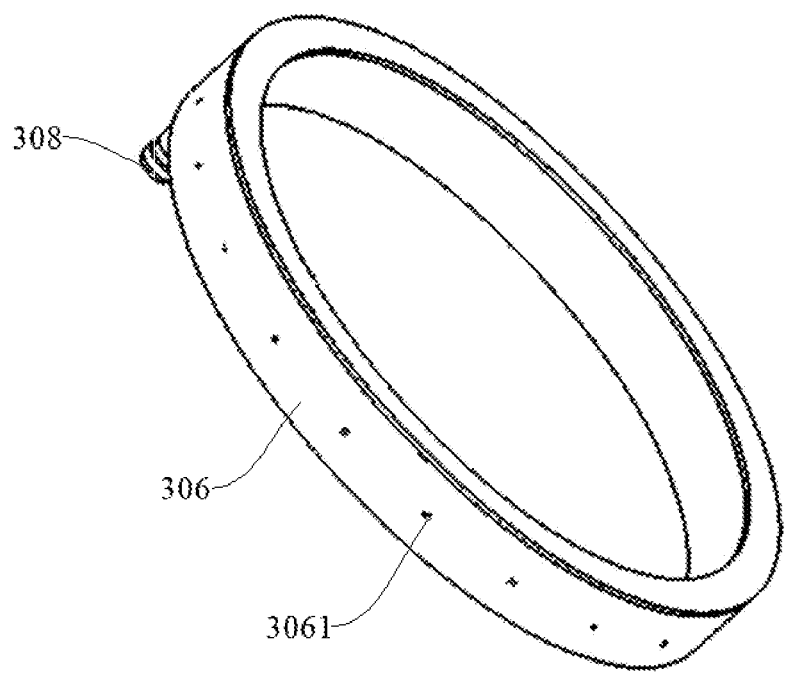
FIG. 22 is a schematic view of an oil spraying ring in a motor according to yet another embodiment of the present disclosure.

Of course, in some other embodiments, as illustrated in FIG. 19, the oil spraying ring 3 may only include the plate 304 and the first barrel 305. The plate 304 has the axial oil spraying hole 3041, and the first barrel 305 has the outer oil spraying hole 3051. At this time, the oil ring inlet 308 may be in the plate 304. Or, as illustrated in FIG. 20, the oil spraying ring 3 only includes the plate 304, and the plate 304 has the axial oil spraying hole 3041. At this time, the oil ring inlet 308 is in the plate 304. Or, as illustrated in FIG. 21, the oil spraying ring 3 only includes the first barrel 305, and the first barrel 305 has the outer oil spraying hole 3051. At this time, the oil ring inlet 308 is in an end of the first barrel 305 facing away from the stator core 1. Or, as illustrated in FIG. 22, the oil spraying ring 3 only includes the second barrel 306, and the second barrel 306 has the inner oil spraying hole 3061. At this time, the oil ring inlet 308 is in an end of the second barrel 306 facing away from the stator core 1.

In some examples, the oil spraying ring 3 is made of oil resistant and high temperature resistant plastics, such as PA6, PA66, PBT, PPA, PPS. A metal may also be used in case of sufficient space and high strength requirements. The number, the size and the position of the oil spraying hole in the oil spraying ring 3 are designed according to the actual situation.

In some examples, the oil spraying ring 3 is sealed with the second housing oil inlet 402 through a sealing member. The sealing member may be an O-ring. For the scenario with a low sealing requirement, the oil spraying ring 3 may also be coupled to the second housing oil inlet 402 by means of a small clearance fit or a transition fit.

The motor 1000 according to embodiments of the present disclosure has the following advantages:

- a cooling structure includes a stator core cooling structure and a winding cooling structure. The stator core 1 and stator winding 2 are cooled by 360° in the peripheral direction to ensure the cooling uniformity. The stator core cooling structure includes the core oil passage 121, and the winding cooling structure includes the oil spraying ring 3;
- the core oil passage 121 is formed by stacking and compressing the laminations (the oil passage may be a spiral oil passage, or a combination of the spiral oil passage and a straight oil passage), thus realizing a simple structure and the convenient processing and manufacturing;
- the oil is injected into the core oil passage 121 from the middle of the core oil passage 121 and sprayed out at two ends, the cooling of the stator core 1 can be realized while the cooling of the winding end 201 through the axial spray of the oil can be realized, without proving other parts;
- the oil spraying ring 3 includes the axial oil spraying hole and the radial oil spraying hole 311, such that the winding end 201 of the stator winding 2 has a better cooling and heat dissipation effect; and
- the core oil passage 121 and the oil spraying ring 3 are independent to each other, which is convenient for the processing and assembly.

A vehicle according to embodiments of the present disclosure includes a vehicle body and a motor 1000. The motor 1000 is on the vehicle body, and the motor 1000 is a motor 1000 of any of the above-described embodiments. The motor 1000 may be used as power of the vehicle.

Therefore, the vehicle according to embodiments of the present disclosure has advantages of higher reliability and so on.

A stator according to embodiments of the present disclosure includes a stator core and a stator winding. The stator core includes a plurality of stator teeth and a core oil passage extending in an axial direction of the stator. The stator winding is wound on the stator teeth, and a projection of the stator winding and a projection of the core oil passage in the axial direction of the stator are at least partially overlapped. The core oil passage includes a spiral first oil passage section, the stator core includes a first lamination and a second lamination stacked with each other, the first lamination has a first oil hole passing through the first lamination along the axial direction of the stator, the second lamination has a second oil hole passing through the second lamination along the axial direction of the stator, the first oil hole and the second oil hole are staggered in a peripheral direction of the stator and in partial communication with each other, and at least one first lamination is adjacent to at least one second lamination to define the first oil passage section.

In some embodiments, a plurality of first laminations and a plurality of second laminations are provided, and at least part of the first laminations and at least part of the second laminations are sequentially and alternately arranged along the axial direction of the stator to define the first oil passage section.

In some embodiments, the core oil passage further includes a straight through second oil passage section. A part of the first laminations are sequentially adjacent, and the first oil holes of adjacent first laminations are aligned in the peripheral direction of the stator to define the second oil passage section, and/or a part of the second laminations are sequentially adjacent, and the second oil holes of adjacent second laminations are aligned in the peripheral direction of the stator to define the second oil passage section.

In some embodiments, a plurality of first oil passage sections are provided, and at least one second oil passage section is between two adjacent first oil passage sections in the axial direction of the stator; and/or a plurality of second oil passage sections are provided, and at least one first oil passage section is between two adjacent second oil passage sections in the axial direction of the stator.

In some embodiments, the core oil passage passes through the stator core along the axial direction of the stator, and at least one port of the core oil passage defines a core oil outlet. The stator winding includes a winding end, and the winding end is at a side of the stator core in the axial direction of the stator. A projection of the core oil outlet and a projection of the winding end in the axial direction of the stator are at least partially overlapped.

In some embodiments, the core oil passage includes a first portion and a second portion, the first portion is closer to an axis of the stator than the second portion in the axial direction of the stator, and the core oil outlet is arranged in the second portion.

In some embodiments, the stator core includes a yoke portion coupled to the stator teeth, the first portion is in the yoke portion, and at least part of the second portion is in the stator teeth.

In some embodiments, the first portion and the second portion are staggered in a radial direction of the stator, the core oil passage further includes a third portion, the third portion is between the first portion and the second portion in the axial direction of the stator, and the first portion is in communication with the second portion through the third portion.

In some embodiments, a part of the third portion is in the yoke portion, and the other part of the third portion is in the stator teeth.

In some embodiments, the first portion includes at least one of the first oil passage section and the second oil passage section.

In some embodiments, a plurality of core oil passages are provided, the plurality of core oil passages are arranged along the peripheral direction of the stator, each of the core oil passages includes the first oil passage section, and first oil passage sections of the plurality of core oil passages are in communication with each other.

In some embodiments, each first lamination defines a plurality of first oil holes, the plurality of first oil holes in a same first lamination are spaced apart along the peripheral direction of the stator, and a first interval is defined between two adjacent first oil holes in the same first lamination. Each second lamination defines a plurality of second oil holes, the plurality of second oil holes in a same second lamination are spaced apart along the peripheral direction of the stator, and a second interval is defined between two adjacent second oil holes in the same second lamination. In the peripheral direction of the stator, a size of the first interval is smaller than a size of the second oil hole, and a size of the second interval is smaller than a size of the first oil hole, in the first oil passage section, each first interval is arranged corresponding to an adjacent second oil hole in the peripheral direction of the stator, and each second interval is arranged corresponding to an adjacent first oil hole in the peripheral direction of the stator, such that the first oil passage sections of the plurality of core oil passages are in communication with each other.

In some embodiments, the first lamination and the second lamination have an identical structure, and the first lamination and the second lamination adjacent to each other are staggered at a preset angle in the peripheral direction of the stator to define the first oil passage section.

In some embodiments, each of two ports of the core oil passage defines the core oil outlet, the stator core has a core oil inlet in communication with the core oil passage, and the core oil inlet is located between two core oil outlets of the core oil passage in the axial direction of the stator.

In some embodiments, at least one core oil inlet is arranged close to a side of the stator core in the axial direction of the stator; and/or at least one core oil inlet is a middle oil inlet, and the middle oil inlet is equidistant from the two core oil outlets of the core oil passage in the axial direction of the stator.

In some embodiments, the core oil inlet is an oil inlet groove with an opening facing outwards, and the oil inlet groove has groove side walls opposite to each other in the peripheral direction of the stator.

In some embodiments, the stator core further includes a third lamination, the third lamination is stacked with the first lamination and the second lamination, the third lamination has a communicating groove passing through the third lamination along the axial direction of the stator, and the communicating groove defines the oil inlet groove.

In some embodiments, the core oil inlet is an oil-inlet annular groove with an opening facing outwards, and the oil-inlet annular groove surrounds the peripheral direction of the stator and is in communication with the plurality of core oil passages.

In some embodiments, the stator core further includes a third lamination, and the third lamination is stacked with the first lamination and the second lamination. The third lamination is between the first lamination and the second lamination in the axial direction of the stator, and an outer diameter of the third lamination is smaller than an outer diameter of the first lamination and an outer diameter of the second lamination, such that the third lamination, the first lamination and the second lamination define the oil-inlet annular groove, or the third lamination is between two adjacent first laminations in the axial direction of the stator, and the outer diameter of the third lamination is smaller than the outer diameters of the first laminations, such that the third lamination and the two adjacent first laminations define the oil-inlet annular groove, or the third lamination is between two adjacent second laminations in the axial direction of the stator, and the outer diameter of the third lamination is smaller than the outer diameters of the second laminations, such that the third lamination and the two adjacent second laminations define the oil-inlet annular groove.

In some embodiments, a projection of at least one of the first oil hole and the second oil hole in the axial direction of the stator has a circular shape, a rectangular shape, a T-shape or a cross-shape.

Embodiments of the present disclosure further propose a motor having the above stator.

The motor according to embodiments of the present disclosure includes a housing and a stator. The housing has a first housing oil inlet, and the stator is in the housing. The stator is a stator of any of the above-described embodiments, and the core oil passage is in communication with the first housing oil inlet.

In some embodiments, the motor further includes an oil spraying ring, the oil spraying ring is in the housing, the oil spraying ring is on at least one side of the stator core in the axial direction of the stator, and the oil spraying ring has an oil ring channel, an oil ring inlet and an oil spraying hole, each of the oil ring inlet and the oil spraying hole is in communication with the oil ring channel, and the oil spraying hole is oriented towards the winding end to spray cooling oil to the winding end. The oil ring inlet is in communication with the core oil passage, and/or the housing has a second housing oil inlet in communication with the oil ring inlet.

In some embodiments, the oil spraying ring has an accommodating groove with a groove opening facing towards the stator core, at least a part of the winding end is in the accommodating groove, a plurality of oil spraying holes are provided, a part of the plurality of oil spraying holes are an axial oil spraying hole extending in the axial direction of the stator, and the other part of the plurality of oil spraying holes are an radial oil spraying hole extending in the radial direction of the stator, the axial oil spraying hole is in a groove bottom wall of the accommodating groove, and the radial oil spraying hole is in a groove side wall of the accommodating groove.

In some embodiments, the groove side wall includes an inner groove wall and an outer groove wall, the inner groove wall and the outer groove wall are spaced apart, and the inner groove wall is at an inner side of the outer groove wall. A plurality of radial oil spraying holes are provided, a part of the plurality of radial oil spraying holes are an inner oil spraying hole, the other part of the plurality of radial oil spraying holes are an outer oil spraying hole, the inner oil spraying hole is in an outer side face of the inner groove wall, and the outer oil spraying hole is in an inner side face of the outer groove wall.

In some embodiments, a plurality of axial oil spraying holes are provided, and the plurality of axial oil spraying holes are spaced apart along the peripheral direction of the stator; a plurality of outer oil spraying holes are provided, and the plurality of outer oil spraying holes are spaced apart along the peripheral direction of the stator; and a plurality of inner oil spraying holes are provided, and the plurality of inner oil spraying holes are spaced apart along the peripheral direction of the stator.

In some embodiments, each outer oil spraying hole and adjacent inner oil spraying hole are staggered in the peripheral direction of the stator.

In some embodiments, the oil spraying ring includes a first barrel, a second barrel and an annular plate, each of the first barrel and the second barrel is coupled to the plate, the plate, the first barrel and the second barrel define the accommodating groove, the first barrel forms the inner groove wall, and the second barrel forms the outer groove wall.

In some embodiments, the plate has a first cavity, the first barrel has a second cavity, the second barrel has a third cavity, the first cavity, the second cavity and the third cavity are in communication with each other, such that the plate, the first barrel and the second barrel define the oil ring channel, and the oil ring inlet is in the plate.

In some embodiments, a part of the plate is at an inner side of the inner groove wall to form a fixing portion, and the fixing portion has a fixing hole configured for a fastener to pass through.

Embodiments of the present disclosure further propose a vehicle having the above motor.

The vehicle according to embodiments of the present disclosure includes a vehicle body and a motor. The motor is on the vehicle body, and the motor is a motor of any of above-described embodiments.

In the stator according to embodiments of the present disclosure, the core oil passage extending in the axial direction of the stator includes the spiral first oil passage section, such that the contact area between the cooling oil and the stator core is increased compared with the related art in which the core oil passage of the stator core is parallel to the axial direction of the stator core, thus improving the heat dissipation efficiency of the stator and facilitating the reliable operation of the motor having the stator.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "peripheral" should be construed to refer to the orientation and position as then described or as illustrated in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

In addition, terms "first" and "second" are only used for descriptive purposes and cannot be understood as indicating or implying relative importance or implicitly indicating the number of indicated technical features. Thus, the features defined by "first" and "second" may include at least one of the features explicitly or implicitly. In the description of the present disclosure, "a plurality of" means at least two such as two or three, unless otherwise expressly and specifically defined.

In the present disclosure, unless otherwise expressly defined, terms such as "mounted," "connected," "coupled," and "fixed" shall be understood broadly, and may be, for example, fixed connections, detachable connections, or integral connections; may also be mechanical or electrical connections or intercommunication; may also be direct connections or indirect connections via intervening media; may also be inner communications or interactions of two elements. For those skilled in the art, the specific meaning of the above terms in the present disclosure can be understood according to the specific situations.

In the present disclosure, unless otherwise expressly defined and specified, a structure in which a first feature is "on" or "below" a second feature may include an embodiment in which the first feature is in direct contact with the second feature, or may further include an embodiment in which the first feature and the second feature are in indirect contact through intermediate media. Furthermore, a first feature "on," "above," or "on top of" a second feature may include an embodiment in which the first feature is right or obliquely "on," "above," or "on top of" the second feature, or just means that the first feature is at a height higher than that of the second feature, while a first feature "below," "under," or "on bottom of" a second feature may include an embodiment in which the first feature is right or obliquely "below," "under," or "on bottom of" the second feature, or just means that the first feature is at a height lower than that of the second feature.

In the description of the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples as well as features of the different embodiments or examples described in this specification.

Although embodiments of the present disclosure have been illustrated and described above, it can be understood that the above embodiments are exemplary and shall not be understood as limitation on the present disclosure, and changes, modifications, alternatives and variations made in the above embodiments by those skilled in the art all fall within the protection scope of the present disclosure.

What is claimed is:

1. A motor, comprising:
    a housing having a first housing oil inlet;
    a stator in the housing and comprising:
        a stator core comprising a plurality of stator teeth and a core oil passage extending in an axial direction of the stator; and
        a stator winding wound on the stator teeth, a projection of the stator winding and a projection of a core oil passage in the axial direction of the stator being at least partially overlapped,
    wherein the core oil passage comprises a spiral first oil passage section, the stator core comprises a first lamination and a second lamination stacked with each other, the first lamination and the second lamination have a first oil hole and a second oil hole both passing through the respective laminations along the axial direction of the stator, respectively, the first oil hole and the second oil hole are staggered in a peripheral direction of the stator and in partial communication with each other, and at least one first lamination is adjacent to at least one second lamination to define the first oil passage section; and the core oil passage is in communication with the first housing oil inlet,
    wherein the stator winding comprises a winding end, the winding end is at a side of the stator core in the axial direction of the stator, the motor further comprises an oil spraying ring, the oil spraying ring is in the housing, the oil spraying ring is on at least one side of the stator core in the axial direction of the stator, and the oil spraying ring has an oil ring channel, an oil ring inlet and an oil spraying hole, each of the oil ring inlet and the oil spraying hole is in communication with the oil ring channel, and the oil spraying hole is oriented towards the winding end to spray the oil to the winding end; and
    the oil ring inlet is in communication with at least one of: the core oil passage, and a second housing oil inlet of the housing
    wherein the oil spraying ring has an accommodating groove with an opening facing towards the stator core, at least part of the winding end is in the accommodating groove, a plurality of oil spraying holes are provided, a part of the plurality of oil spraying holes are an axial oil spraying hole extending in the axial direction of the stator, and the other part of the plurality of oil spraying holes are a radial oil spraying hole extending in the radial direction of the stator, the axial oil spraying hole is in a groove bottom wall of the accommodating groove, and the radial oil spraying hole is in a groove side wall of the accommodating groove.

2. The motor according to claim 1, wherein a plurality of first laminations and a plurality of second laminations are provided, and at least part of the first laminations and at least part of the second laminations are sequentially and alternately arranged along the axial direction of the stator to define the first oil passage section.

3. The motor according to claim 2, wherein the core oil passage further comprises a straight through second oil passage section;
    the second oil passage section is defined by at least one of:
    a part of the first laminations are sequentially adjacent, with the first oil holes of adjacent first laminations aligned in the peripheral direction of the stator, and
    a part of the second laminations are sequentially adjacent, with the second oil holes of adjacent second laminations aligned in the peripheral direction of the stator.

4. The motor according to claim 3, wherein the core oil passage comprises at least one of:
    a plurality of first oil passage sections, with at least one second oil passage section between two adjacent first oil passage sections in the axial direction of the stator; and
    a plurality of second oil passage sections, with at least one first oil passage section between two adjacent second oil passage sections in the axial direction of the stator.

5. The statormotor according to claim 1, wherein a plurality of core oil passages are provided, the plurality of core oil passages are arranged along the peripheral direction of the stator, each of the core oil passages comprises the first oil passage section, and the first oil passage sections of the plurality of core oil passages are in communication with each other.

6. The motor according to claim 5, wherein a plurality of first oil holes are provided in each first lamination, the plurality of first oil holes in a same first lamination are spaced apart along the peripheral direction of the stator, and a first interval is defined between two adjacent first oil holes in the same first lamination;
- a plurality of second oil holes are provided in each second lamination, the plurality of second oil holes in a same second lamination are spaced apart along the peripheral direction of the stator, and a second interval is defined between two adjacent second oil holes in the same second lamination;
- in the peripheral direction of the stator, a size of the first interval is smaller than a size of the second oil hole, and a size of the second interval is smaller than a size of the first oil hole, in the first oil passage section, each first interval is arranged corresponding to an adjacent second oil hole in the peripheral direction of the stator, and each second interval is arranged corresponding to an adjacent first oil hole in the peripheral direction of the stator, such that the first oil passage sections of the plurality of core oil passages are in communication with each other.

7. The motor according to claim 6, wherein the first lamination and the second lamination have an identical structure, and the first lamination and the second lamination adjacent to each other are staggered at a preset angle in the peripheral direction of the stator to define the first oil passage section.

8. The motor according to claim 5, wherein the core oil passage passes through the stator core along the axial direction of the stator, each of two ports of the core oil passage defines a core oil outlet, the stator core has a core oil inlet in communication with the core oil passage, and the core oil inlet is located between two core oil outlets of the core oil passage in the axial direction of the stator.

9. The motor according to claim 8, wherein at least one core oil inlet is arranged to be at least one of:
- close to a side of the stator core in the axial direction of the stator; and
- equidistant from the two core oil outlets of the core oil passage in the axial direction of the stator.

10. The motor according to claim 8, wherein the core oil inlet is an oil inlet groove with an opening facing outwards, and the oil inlet groove has groove side walls opposite to each other in the peripheral direction of the stator.

11. The motor according to claim 8, wherein the core oil inlet is an oil-inlet annular groove with an opening facing outwards, and the oil-inlet annular groove surrounds the peripheral direction of the stator and is in communication with the plurality of core oil passages.

12. The motor according to claim 11, wherein the stator core further comprises a third lamination, and the third lamination is stacked with the first lamination and the second lamination;
- the third lamination is between the first lamination and the second lamination in the axial direction of the stator, and an outer diameter of the third lamination is smaller than an outer diameter of the first lamination and an outer diameter of the second lamination, such that the third lamination, the first lamination and the second lamination define the oil-inlet annular groove, or
- the third lamination is between two adjacent first laminations in the axial direction of the stator, and the outer diameter of the third lamination is smaller than the outer diameters of the first laminations, such that the third lamination and the two adjacent first laminations define the oil-inlet annular groove, or
- the third lamination is between two adjacent second laminations in the axial direction of the stator, and the outer diameter of the third lamination is smaller than the outer diameters of the second laminations, such that the third lamination and the two adjacent second laminations define the oil-inlet annular groove.

13. The motor according to claim 1, wherein the groove side wall comprises an inner groove wall and an outer groove wall, the inner groove wall and the outer groove wall are spaced apart, and the inner groove wall is at an inner side of the outer groove wall; and
- a plurality of radial oil spraying holes are provided, a part of the plurality of radial oil spraying holes are an inner oil spraying hole, the other part of the plurality of radial oil spraying holes are an outer oil spraying hole, the inner oil spraying hole is in an outer side face of the inner groove wall, and the outer oil spraying hole is in an inner side face of the outer groove wall.

* * * * *